United States Patent [19]
Kamo et al.

[11] Patent Number: 5,684,638
[45] Date of Patent: Nov. 4, 1997

[54] TWO-UNIT ZOOM LENS SYSTEM HAVING HIGH ZOOM RATIO

[75] Inventors: Yuji Kamo, Hino; Yasuji Ogata, Akigawa, both of Japan

[73] Assignee: Olympus Optical Co., Ltd., Tokyo, Japan

[21] Appl. No.: 408,705

[22] Filed: Mar. 22, 1995

[30] Foreign Application Priority Data

Mar. 23, 1994 [JP] Japan .................... 6-051716

[51] Int. Cl.⁶ .......................... G02B 15/14; G02B 13/18
[52] U.S. Cl. .......................... 359/692; 359/714; 359/715
[58] Field of Search ...................... 359/692, 689, 359/686, 714, 715

[56] References Cited

U.S. PATENT DOCUMENTS

| | | | |
|---|---|---|---|
| 5,162,947 | 11/1992 | Ito | 359/692 |
| 5,218,478 | 6/1993 | Itoh | 359/692 |
| 5,305,148 | 4/1994 | Ikemori et al. | 359/689 |
| 5,315,440 | 5/1994 | Betensky et al. | 359/676 |
| 5,327,290 | 7/1994 | Fukushima et al. | 359/692 |
| 5,365,376 | 11/1994 | Itoh | 359/686 |
| 5,386,321 | 1/1995 | Kawamura | 359/692 |

FOREIGN PATENT DOCUMENTS

| | | |
|---|---|---|
| 62-113120 | 5/1987 | Japan . |
| 3127008 | 5/1991 | Japan . |
| 3150518 | 6/1991 | Japan . |
| 3158814 | 7/1991 | Japan . |
| 3200913 | 9/1991 | Japan . |
| 5-60977 | 3/1993 | Japan . |
| 51135337 | 5/1993 | Japan . |
| 5188292 | 7/1993 | Japan . |
| 5188293 | 7/1993 | Japan . |
| 5224122 | 9/1993 | Japan . |
| 5-257063 | 10/1993 | Japan . |

Primary Examiner—Scott J. Sugarman
Attorney, Agent, or Firm—Cushman, Darby & Cushman IP Group of Pillsbury Madison & Sutro LLP

[57] ABSTRACT

A two-unit zoom lens system having a front lens unit of positive refractive power, and a rear lens unit of negative refractive power. The zoom lens system has a reduced number of constituent lens elements, and yet provides a zoom ratio of nearly 3 and favorable performance at reduced cost. The zoom lens system has a front lens unit ($G_F$) of positive refractive power, and a rear lens unit ($G_R$) of negative refractive power. Zooming is effected by varying the spacing between the two lens units. The front lens unit has a first lens component ($G_{F1}$) of negative refractive power, and a second lens component ($G_{F2}$) of positive refractive power. The first lens component includes no positive lens element, but has at least one aspherical surface. The second lens component includes a negative lens element and a positive lens element, which are disposed in the mentioned order. The zoom lens system satisfies at least the condition related to the focal length of the front lens unit, which must be satisfied to maintain a practical size of the lens system, and the condition related to the center thickness ratio between the negative and positive lens elements of the second lens component, which is concerned with the correction of axial chromatic aberration.

11 Claims, 21 Drawing Sheets

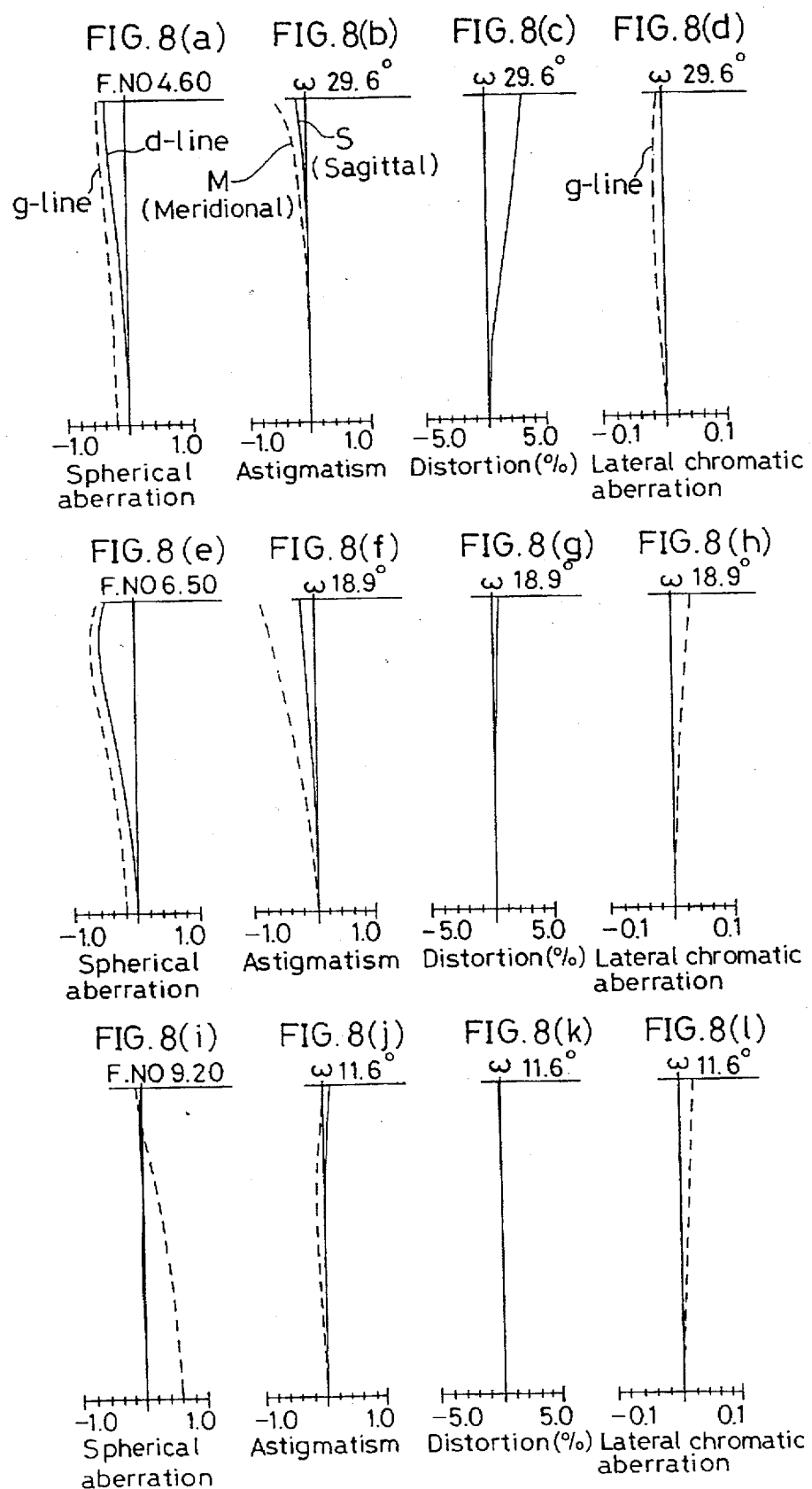

FIG.9(a) F.NO 4.60
FIG.9(b) ω 29.6°
FIG.9(c) ω 29.6°
FIG.9(d) ω 29.6°
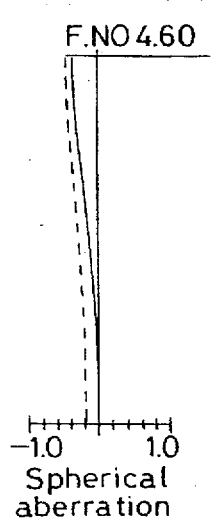
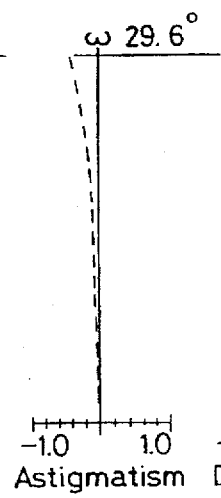
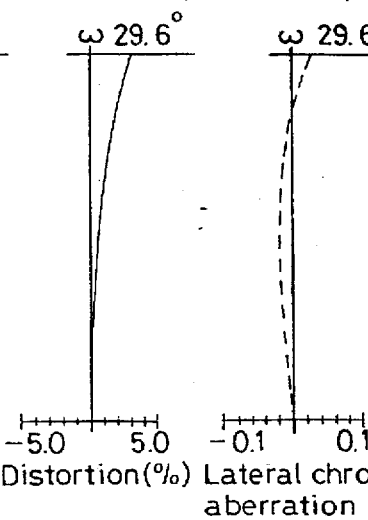
-1.0　1.0 Spherical aberration
-1.0　1.0 Astigmatism
-5.0　5.0 Distortion(%)
-0.1　0.1 Lateral chromatic aberration
FIG.9(e) F.NO 6.50
FIG.9(f) ω 18.9°
FIG.9(g) ω 18.9°
FIG.9(h) ω 18.9°
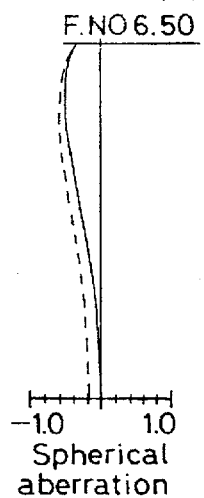
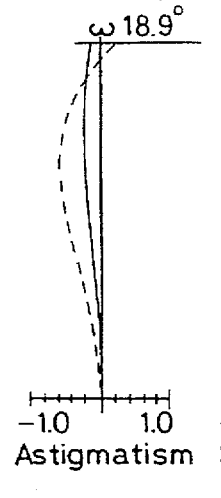
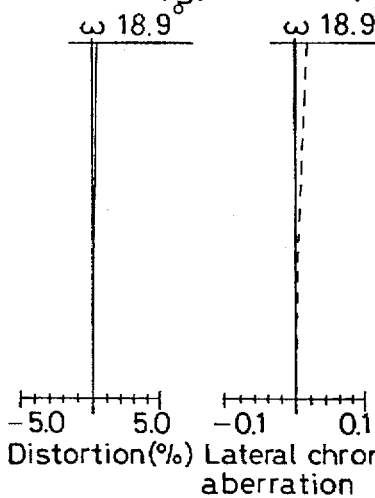
-1.0　1.0 Spherical aberration
-1.0　1.0 Astigmatism
-5.0　5.0 Distortion(%)
-0.1　0.1 Lateral chromatic aberration
FIG.9(i) F.NO 9.20
FIG.9(j) ω 11.6°
FIG.9(k) ω 11.6°
FIG.9(l) ω 11.6°
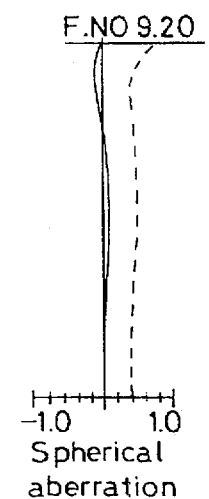
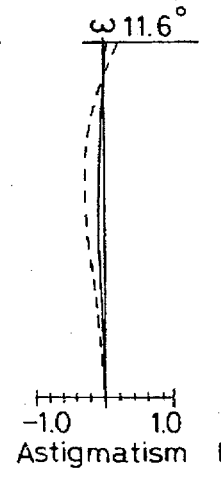
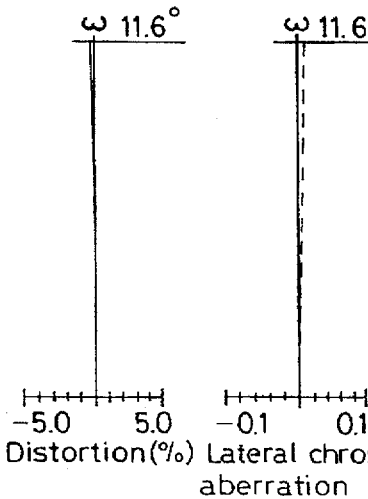
-1.0　1.0 Spherical aberration
-1.0　1.0 Astigmatism
-5.0　5.0 Distortion(%)
-0.1　0.1 Lateral chromatic aberration

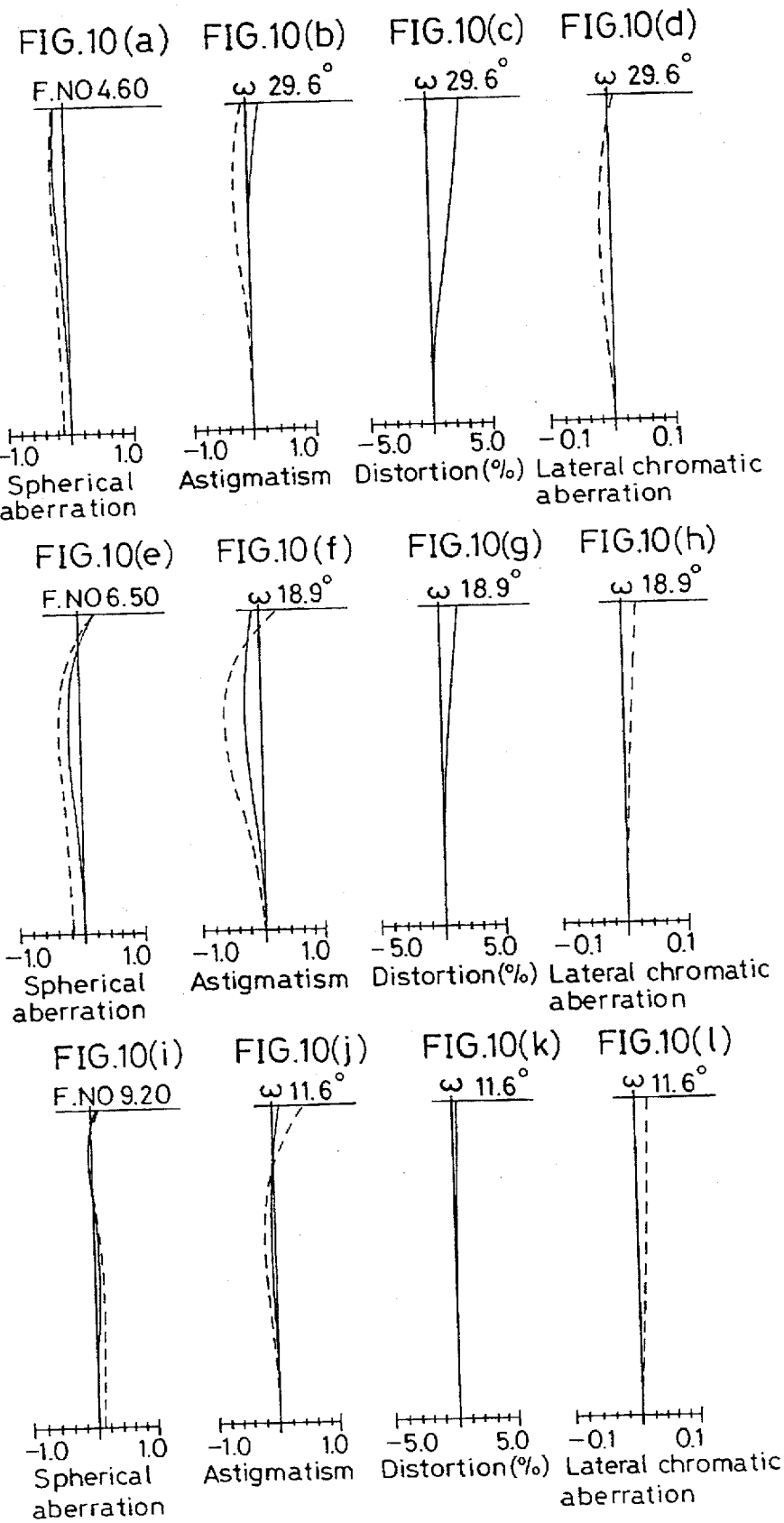

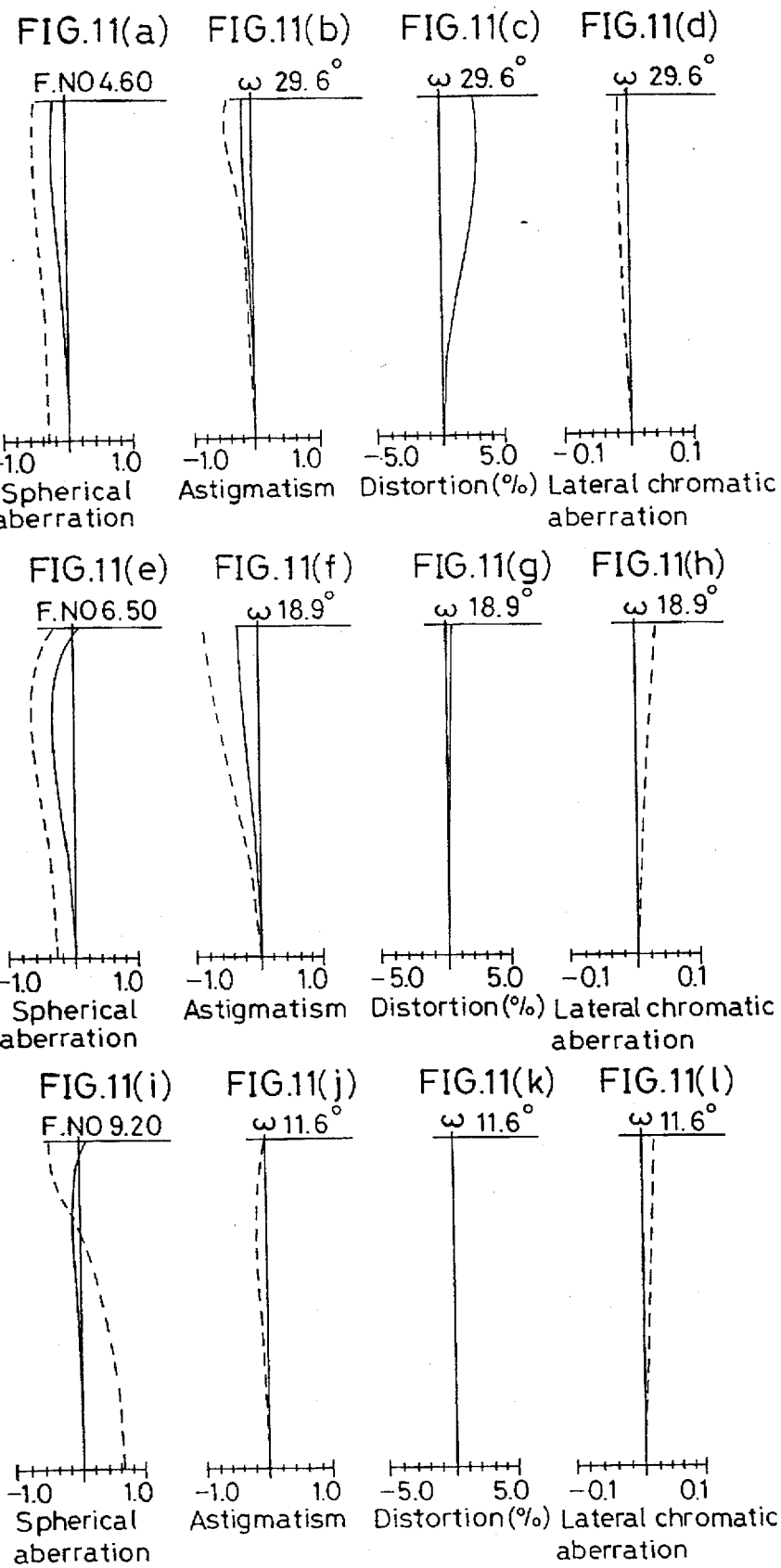

FIG.12(a)  FIG.12(b)  FIG.12(c)  FIG.12(d)
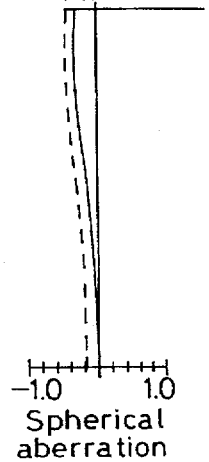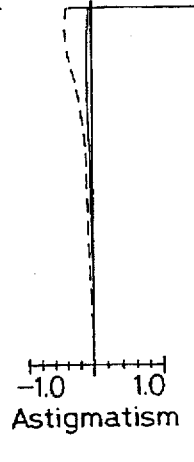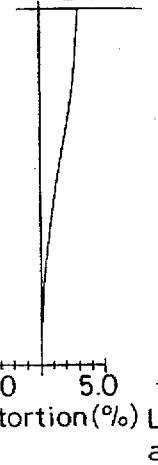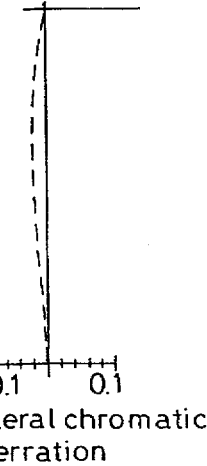
F.NO 4.60   ω 29.6°   ω 29.6°   ω 29.6°
−1.0  1.0   −1.0  1.0   −5.0  5.0   −0.1  0.1
Spherical   Astigmatism  Distortion(%)  Lateral chromatic
aberration                              aberration
FIG.12(e)  FIG.12(f)  FIG.12(g)  FIG.12(h)
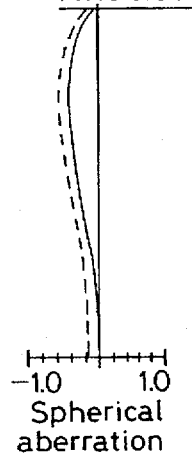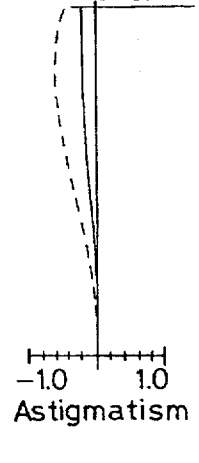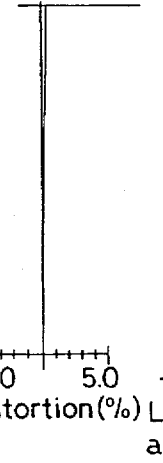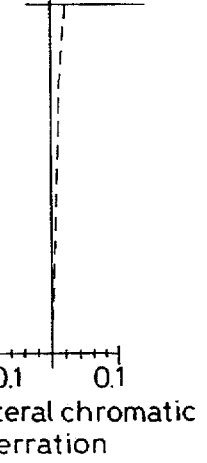
F.NO 6.50   ω 18.9°   ω 18.9°   ω 18.9°
−1.0  1.0   −1.0  1.0   −5.0  5.0   −0.1  0.1
Spherical   Astigmatism  Distortion(%)  Lateral chromatic
aberration                              aberration
FIG.12(i)  FIG.12(j)  FIG.12(k)  FIG.12(l)
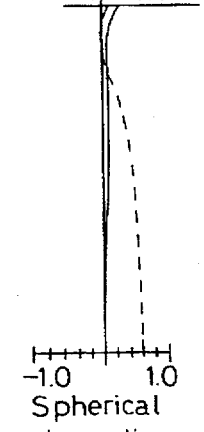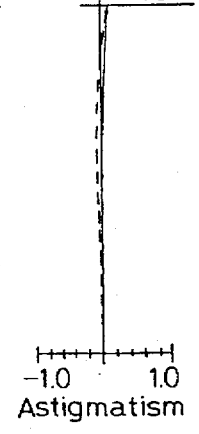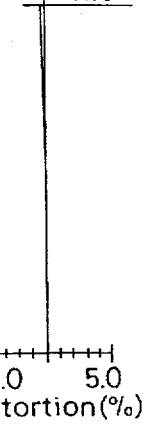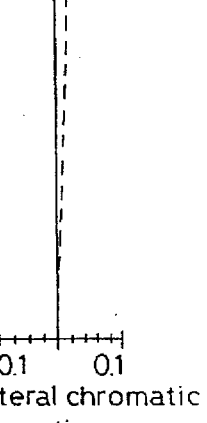
F.NO 9.20   ω 11.6°   ω 11.6°   ω 11.6°
−1.0  1.0   −1.0  1.0   −5.0  5.0   −0.1  0.1
Spherical   Astigmatism  Distortion(%)  Lateral chromatic
aberration                              aberration F.NO 4.60
-1.0  1.0
Spherical aberration ω 29.6°
-1.0  1.0
Astigmatism ω 29.6°
-5.0  5.0
Distortion(%)

ω 29.6°
-0.1  0.1
Lateral chromatic aberration

F.NO 6.50
-1.0  1.0
Spherical aberration

ω 18.9°
-1.0  1.0
Astigmatism

ω 18.9°
-5.0  5.0
Distortion(%)

ω 18.9°
-0.1  0.1
Lateral chromatic aberration

F.NO 9.20
-1.0  1.0
Spherical aberration

ω 11.6°
-1.0  1.0
Astigmatism

ω 11.6°
-5.0  5.0
Distortion(%)

ω 11.6°
-0.1  0.1
Lateral chromatic aberration

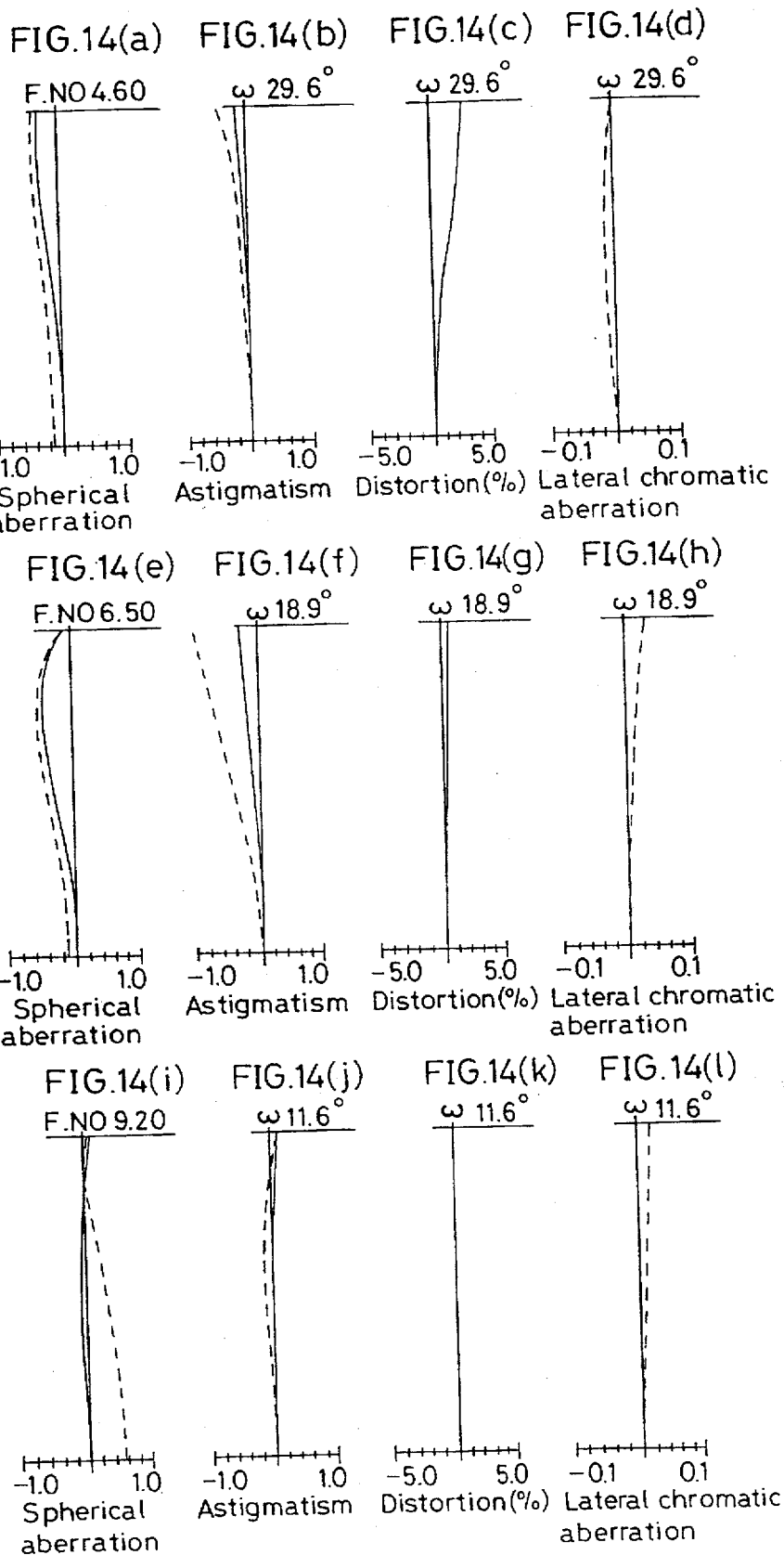

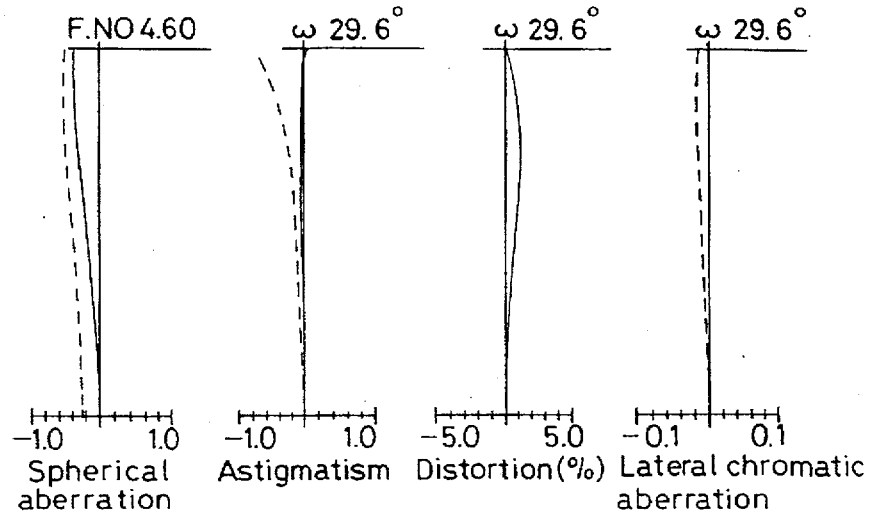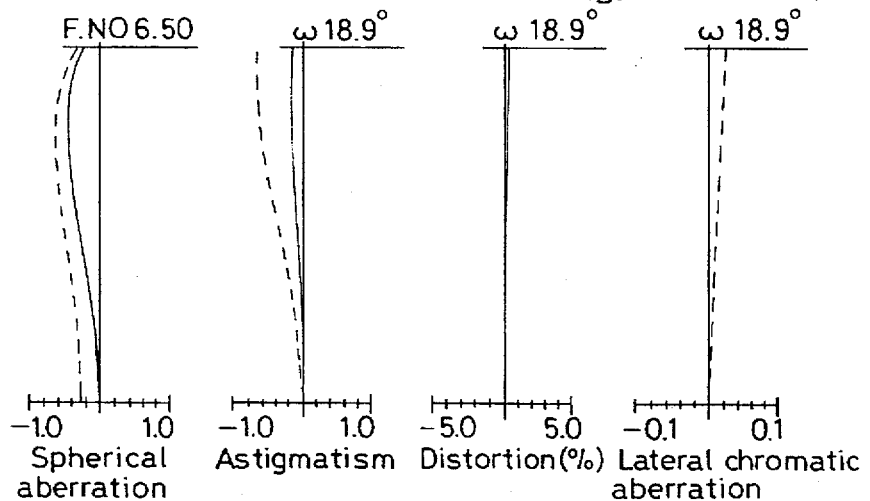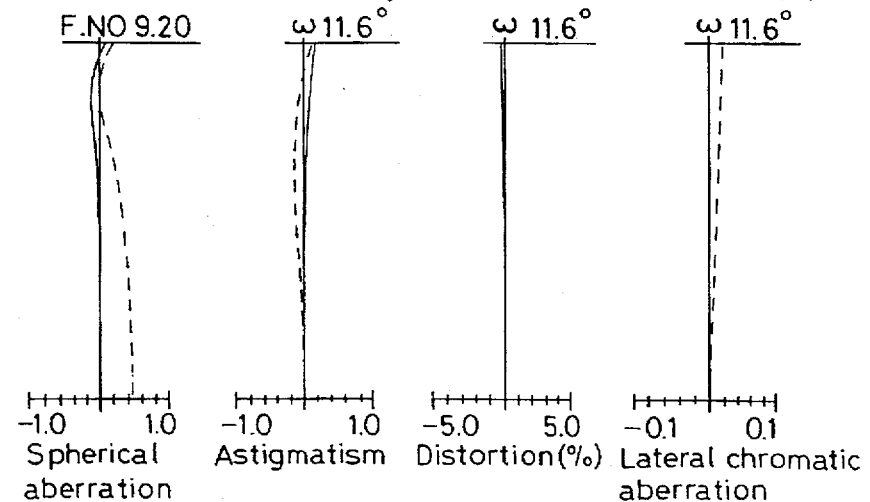

FIG.16(a) F.NO 4.60 Spherical aberration (−1.0 to 1.0)

FIG.16(b) ω 29.6° Astigmatism (−1.0 to 1.0)

FIG.16(c) ω 29.6° Distortion(%) (−5.0 to 5.0)

FIG.16(d) ω 29.6° Lateral chromatic aberration (−0.1 to 0.1)

FIG.16(e) F.NO 6.50 Spherical aberration (−1.0 to 1.0)

FIG.16(f) ω 18.9° Astigmatism (−1.0 to 1.0)

FIG.16(g) ω 18.9° Distortion(%) (−5.0 to 5.0)

FIG.16(h) ω 18.9° Lateral chromatic aberration (−0.1 to 0.1)

FIG.16(i) F.NO 9.20 Spherical aberration (−1.0 to 1.0)

FIG.16(j) ω 11.6° Astigmatism (−1.0 to 1.0)

FIG.16(k) ω 11.6° Distortion(%) (−5.0 to 5.0)

FIG.16(l) ω 11.6° Lateral chromatic aberration (−0.1 to 0.1)

FIG.17(a) FIG.17(b) FIG.17(c) FIG.17(d)
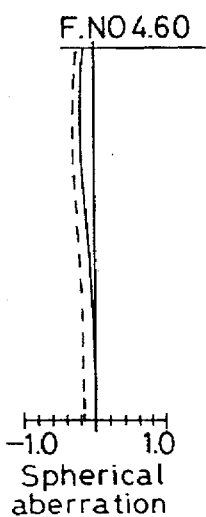
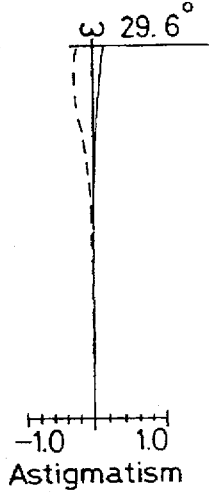
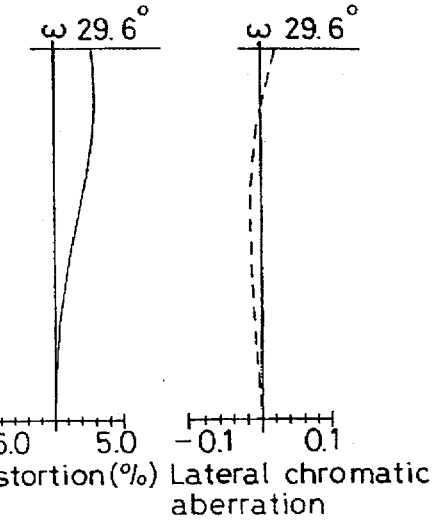
F.NO 4.60   ω 29.6°   ω 29.6°   ω 29.6°
−1.0  1.0   −1.0  1.0   −5.0  5.0   −0.1  0.1
Spherical   Astigmatism  Distortion(%)  Lateral chromatic
aberration                              aberration
FIG.17(e) FIG.17(f) FIG.17(g) FIG.17(h)
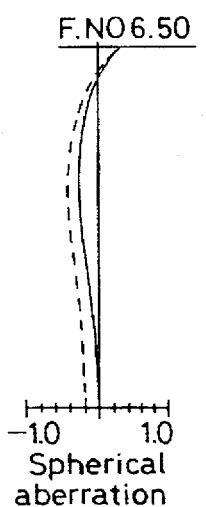
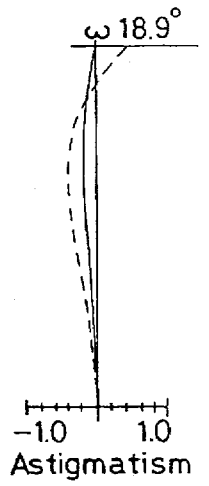
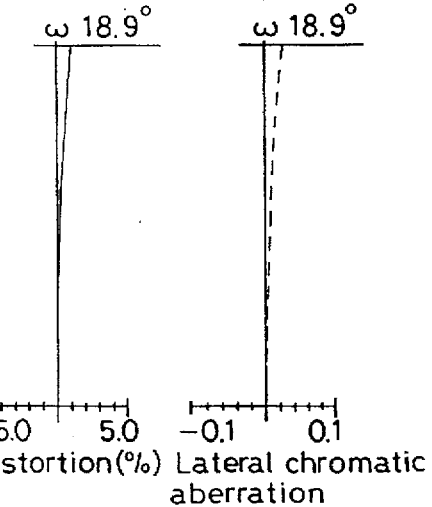
F.NO 6.50   ω 18.9°   ω 18.9°   ω 18.9°
−1.0  1.0   −1.0  1.0   −5.0  5.0   −0.1  0.1
Spherical   Astigmatism  Distortion(%)  Lateral chromatic
aberration                              aberration
FIG.17(i) FIG.17(j) FIG.17(k) FIG.17(l)
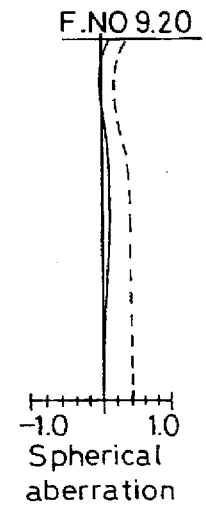
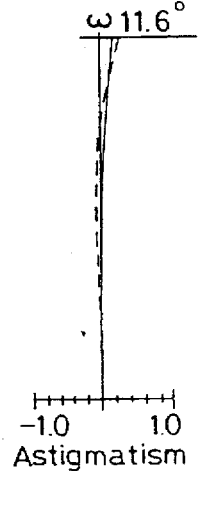
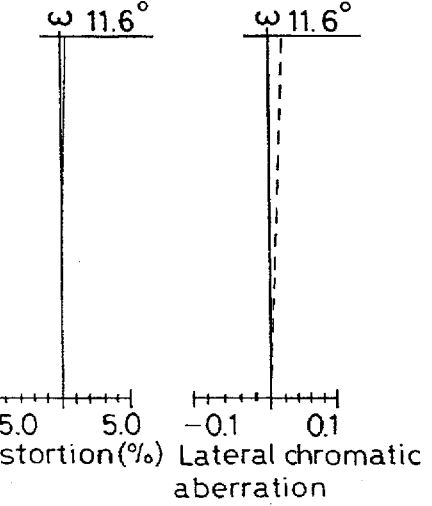
F.NO 9.20   ω 11.6°   ω 11.6°   ω 11.6°
−1.0  1.0   −1.0  1.0   −5.0  5.0   −0.1  0.1
Spherical   Astigmatism  Distortion(%)  Lateral chromatic
aberration                              aberration

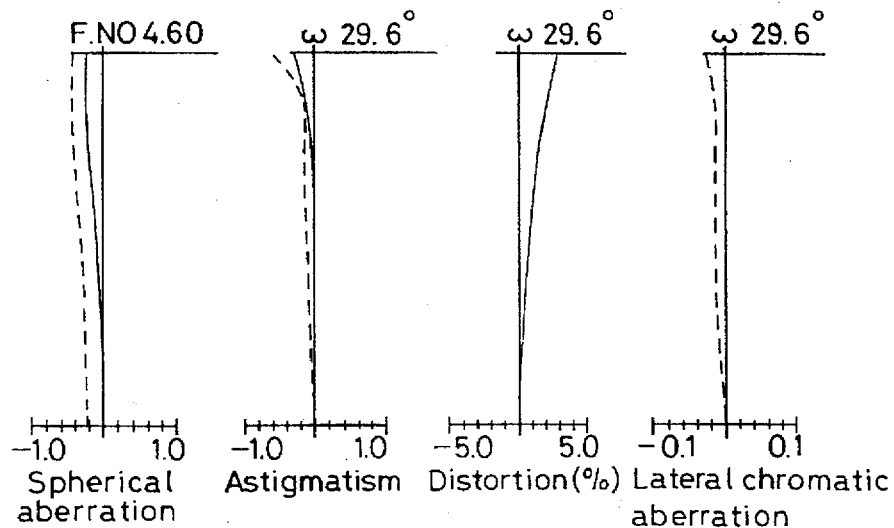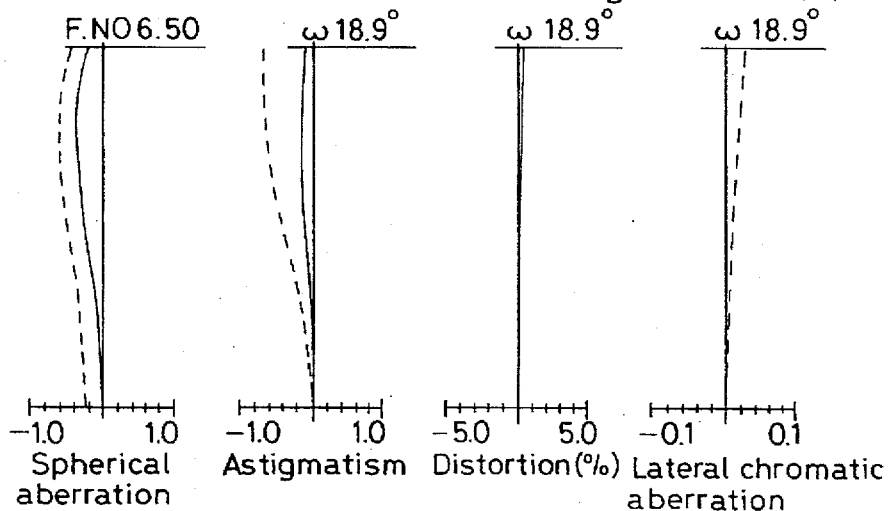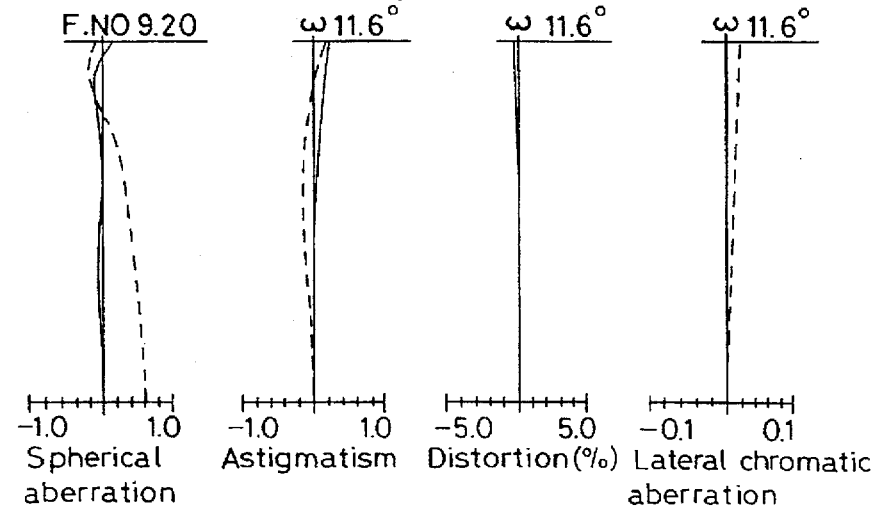

FIG.19(a) FIG.19(b) FIG.19(c) FIG.19(d)
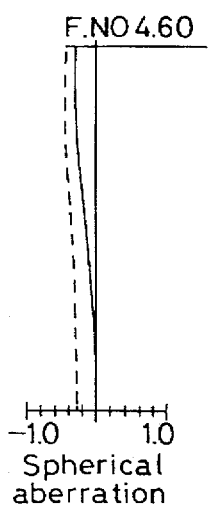
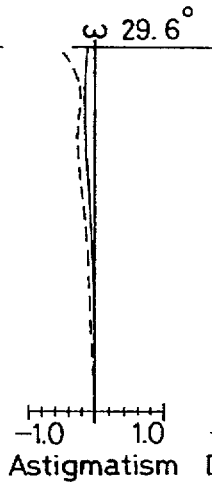
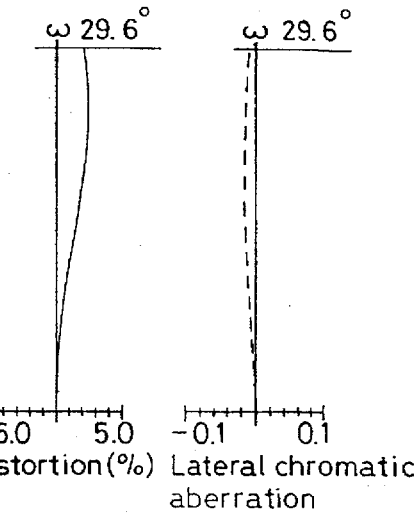
F.NO 4.60  ω 29.6°  ω 29.6°  ω 29.6°
-1.0  1.0   -1.0  1.0   -5.0  5.0   -0.1  0.1
Spherical   Astigmatism   Distortion(%)   Lateral chromatic
aberration                                  aberration
FIG.19(e) FIG.19(f) FIG.19(g) FIG.19(h)
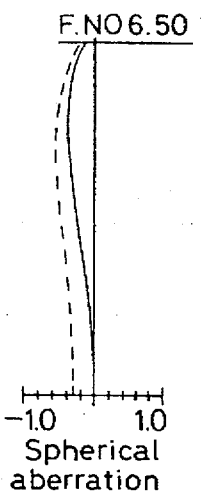
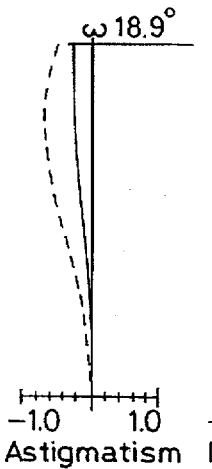
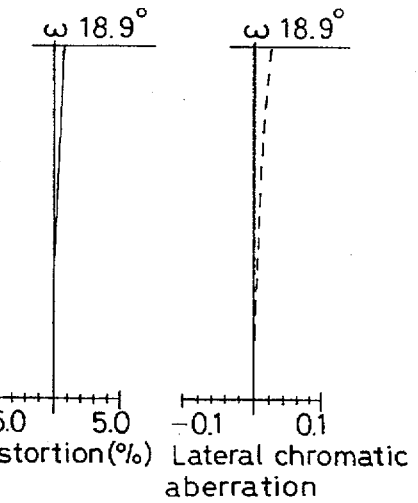
F.NO 6.50  ω 18.9°  ω 18.9°  ω 18.9°
-1.0  1.0   -1.0  1.0   -5.0  5.0   -0.1  0.1
Spherical   Astigmatism   Distortion(%)   Lateral chromatic
aberration                                  aberration
FIG.19(i) FIG.19(j) FIG.19(k) FIG.19(l)
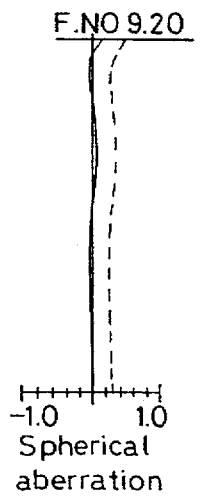
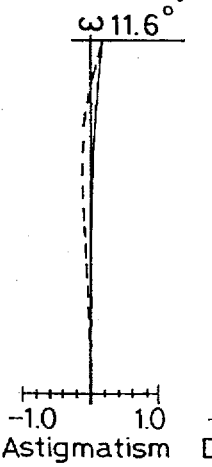
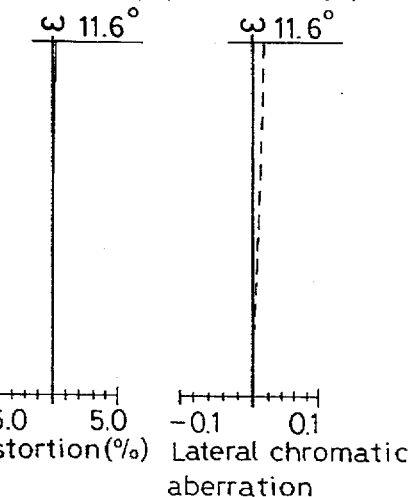
F.NO 9.20  ω 11.6°  ω 11.6°  ω 11.6°
-1.0  1.0   -1.0  1.0   -5.0  5.0   -0.1  0.1
Spherical   Astigmatism   Distortion(%)   Lateral chromatic
aberration                                  aberration

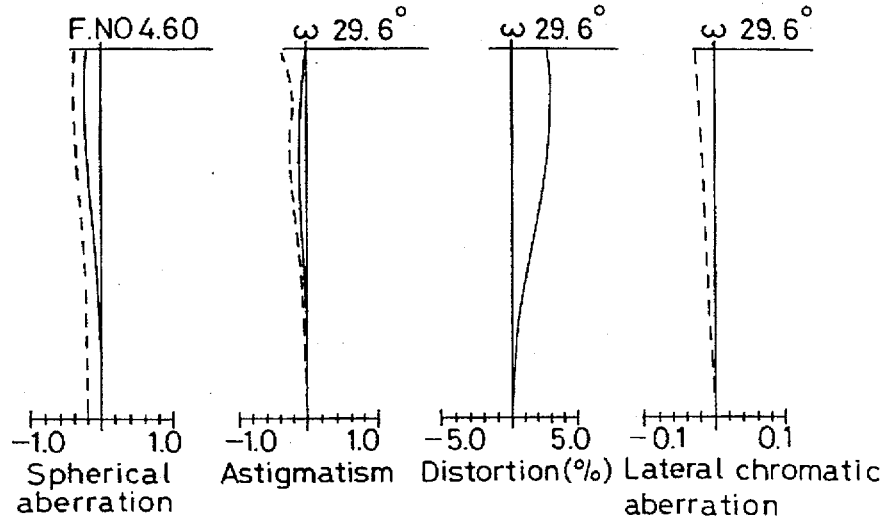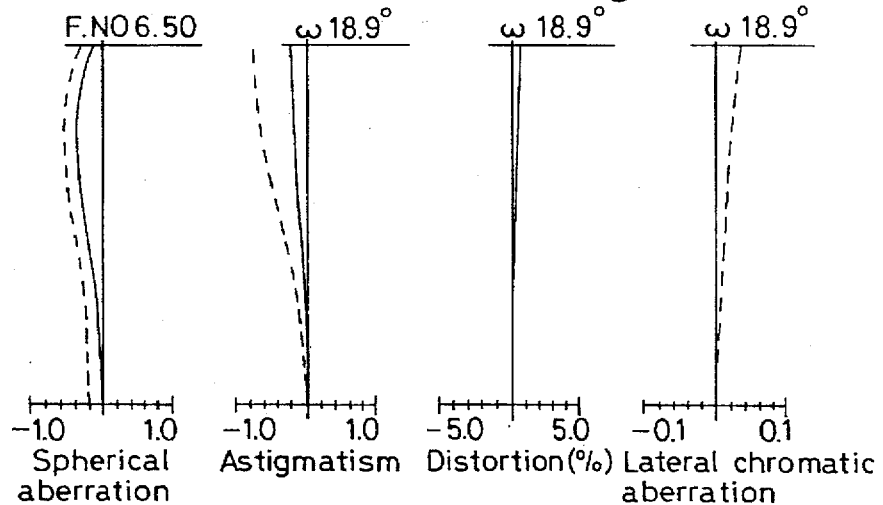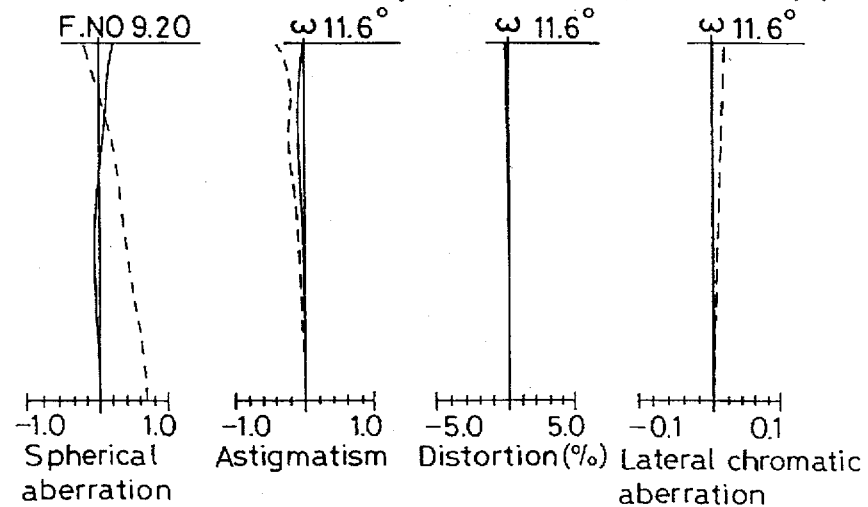

TWO-UNIT ZOOM LENS SYSTEM HAVING HIGH ZOOM RATIO

BACKGROUND OF THE INVENTION

The present invention relates to a two-unit zoom lens system having a high zoom ratio and, more particularly, to a two-unit zoom lens system suitable for use with a lens shutter camera or the like, which is not limited in the length of back focus. The zoom lens system has a reduced number of constituent lens elements and yet provides a high zoom ratio.

As zoom lens systems which are applicable to lens shutter cameras, two-unit zoom lens systems have heretofore been known, and there have been proposed many zoom lens systems, some of which have already been produced on a commercial basis. Among them, three-unit zoom lens systems have been generally used to provide a zoom ratio of the order of 3. However, this type of zoom lens system has the disadvantage, because of the relatively large number of lens units, that the lens frame structure and the driving mechanism are likely to become complicated, and the number of constituent lens elements is also likely to increase. Therefore, the three-unit zoom lens systems are disadvantageous from the viewpoint of cost.

Meanwhile, two-unit zoom lens systems have the smallest number of lens units in zoom lens arrangements, and are therefore advantageous from the viewpoint of both structure and cost. In this type of zoom lens system, however, the variation of aberration caused by zooming is large. Particularly, the variation of field curvature is large. Therefore, the image quality is likely to become degraded at the middle focal length position, and thus the two-unit type zoom lens arrangement has heretofore been unsuitable for attaining a zoom lens system having a high zoom ratio. Japanese Patent Application Laid-Open (KOKAI) No. 62-113120 discloses one example of the conventional two-unit zoom lens systems. The first example of this related art has a front lens unit of positive refractive power, and a rear lens unit of negative refractive power. The front lens unit has a first lens component which includes a positive lens element and a negative lens element, and which has a negative refractive power as a whole, and a second lens component which includes a cemented lens composed of a negative lens element and a positive lens element, and which has a positive refractive power as a whole. The rear lens unit has a positive lens element, and two negative lens elements. Thus, Japanese Patent Application Laid-Open (KOKAI) No. 62-113120 proposes a zoom lens system which has 7 lens elements arranged in 6 groups, and which provides a focal length ranging from 39 mm to 68 mm, i.e. a zoom ratio of approximately 2.

In the development of zoom lens systems, it has heretofore been essential to reduce the overall length of the lens system in order to achieve a reduction in size of the camera. An effective way of reducing the overall length of the lens system is to reduce the amount of movement of each lens unit for zooming. Therefore, it is necessary to increase the refractive power of each zoom lens unit. Under these circumstances, the number of constituent lens elements tends to increase in order to effect favorable aberration correction. However, with the development of lens frames of high accuracy and high function, there has recently been an increasing tendency to reduce the size of a camera by using a collapsible mount type lens system. As a result, in the development of zoom lens systems these days, more importance is placed on the reduction in the number of constituent lens elements to reduce cost than on the reduction in overall length of the lens system.

In view of the above-described circumstances, there have heretofore been proposed some two-unit zoom lens systems which have an increased zoom ratio or a reduced number of constituent lens elements, or which are improved in the variation of the field curvature.

Japanese Patent Application Laid-Open (KOKAI) Nos. 03-127008 and 03-158814 are known as two-unit zoom lens systems in which the entire lens system is composed of 4 lens elements arranged in 4 groups. In either of the zoom lens systems, the front lens unit has a negative lens element and a positive lens element, which are disposed in the mentioned order, and the rear lens unit has a positive lens element and a negative lens element, which are disposed in the mentioned order. The former publication discloses an example having a focal length range of the order of from 39 mm to 87 mm. The latter publication discloses an example having a focal length range of the order of from 36 mm to 68 mm.

Japanese Patent Application Laid-Open (KOKAI) Nos. 05-113537, 05-188292, 05-188293 and 05-224122 are known as two-unit zoom lens systems in which the entire lens system is composed of about 5 lens elements. In any of these zoom lens systems, the front lens unit has a lens element of weak refractive power, and a doublet of positive and negative lens elements, which are cemented together or air-spaced. Japanese Patent Application Laid-Open (KOKAI) No. 05-113537 discloses an example having a focal length range of the order of from 39 mm to 87 mm. Japanese Patent Application Laid-Open (KOKAI) No. 05-188292 discloses an example having a focal length range of the order of from 39 mm to 59 mm. Japanese Patent Application Laid-Open (KOKAI) No. 05-188293 discloses an example having a focal length range of the order of from 39 mm to 87 mm. Japanese Patent Application Laid-Open (KOKAI) No. 05-224122 discloses an example having a focal length range of the order of from 39 mm to 83 mm. All the zoom lens systems, except Japanese Patent Application Laid-Open (KOKAI) No. 05-188293, use plastic lenses, particularly for the lens elements of weak refractive power. In Japanese Patent Application Laid-Open (KOKAI) No. 05-224122, all the lens elements are plastic lenses.

Japanese Patent Application Laid-Open (KOKAI) Nos.03-200913 and 05-257063 are known as two-unit zoom lens systems in which the entire lens system is composed of about 6 lens elements. In either of the zoom lens systems, the front lens unit has a negative meniscus lens element having a convex surface directed toward the object side, a meniscus lens element having a convex surface directed toward the image side, and a cemented lens of a positive lens element and a negative lens element. The former publication discloses an example having a focal length range of the order of from 29 mm to 50 mm. The latter publication discloses an example having a focal length range of the order of from 36 mm to 69 mm.

Japanese Patent Application Laid-Open (KOKAI) Nos. 03-150518 and 05-60977 are known as zoom lens systems which have a relatively large number of zoom lens units, and yet have a reduced number of constituent lens elements. The former is a three-unit zoom lens system having a negative lens unit, a positive lens unit, and a negative lens element. The fifth example of the three-unit zoom lens system has a 1-st lens unit which includes a biconcave lens element, a 2-nd lens unit which includes a negative lens element and a positive lens element, and a 3-rd lens unit which includes a biconcave lens element, and it has a focal length range of the order of from 36 mm to 102 mm. The latter is a four-unit zoom lens system having, in order from the object side, a negative lens unit, a negative lens unit, a positive lens unit, and a negative lent unit, or a negative lens unit, a positive lens unit, a negative lens unit, and a negative lens unit. A principal example of the four-unit zoom lens system has 1-st and 2-nd lens units, each including a negative meniscus lens element having a convex surface directed toward the object side, a 3-rd lens unit which includes only a positive lens element, or a combination of a positive lens element and a negative lens element, which are cemented together, and a 4-th lens unit which includes a positive lens element and a negative lens element. This four-unit zoom lens system has a focal length range of the order of from 36 mm to 102 mm. In one example of the four-unit zoom lens system, the 2-nd lens unit is disposed in close proximity to the 1-st lens unit; in another example, the 2-nd lens unit is disposed in close proximity to the 3-rd lens unit.

The above-described conventional zoom lens systems have the following disadvantages:

Japanese Patent Application Laid-Open (KOKAI) No. 62-113120 has a zoom ratio of only about 1.7, and needs a relatively large number of constituent lens elements, i.e. 7, which is unfavorable from the viewpoint of cost.

Japanese Patent Application Laid-Open (KOKAI) No. 03-127008 needs a relatively small number of constituent lens elements, i.e. 4, but has a low zoom ratio, i.e. about 2.2, and suffers from large distortion at the wide end.

Japanese Patent Application Laid-Open (KOKAI) No. 03-158814 needs a relatively small number of constituent lens elements, i.e. 4, but has a low zoom ratio, i.e. about 1.9. Further, since an excessively large amount of chromatic aberration is produced, the image quality is inferior.

Japanese Patent Application Laid-Open (KOKAI) No. 05-113537 has an insufficient zoom ratio, i.e. about 2.2.

Japanese Patent Application Laid-Open (KOKAI) No. 05-188292 has an insufficient zoom ratio, i.e. about 1.5.

Japanese Patent Application Laid-Open (KOKAI) No. 05-188293 has an insufficient zoom ratio, i.e. about 2.2.

Japanese Patent Application Laid-Open (KOKAI) No. 05-224122 has an insufficient zoom ratio, i.e. about 2.1. Since all the lens elements are plastic lenses, the lens system is readily affected by changes in temperature-humidity conditions. Since no measures are taken to eliminate or minimize the effect of temperature and humidity on the plastic lenses, this zoom lens system is unsuitable for practical use.

Japanese Patent Application Laid-Open (KOKAI) No. 03-200913 has an insufficient zoom ratio, i.e. about 1.7.

Japanese Patent Application Laid-Open (KOKAI) No. 05-257063 has an insufficient zoom ratio, i.e. about 1.9.

Japanese Patent Application Laid-Open (KOKAI) No. 03-150518 has a relatively high zoom ratio, i.e. about 2.8. However, since the F-number is exceedingly large, this zoom lens system is unsuitable for practical use. Aberration is also excessively large on the whole.

Japanese Patent Application Laid-Open (KOKAI) No. 05-60997 has a relatively high zoom ratio, i.e. about 2.8. However, since an excessively large amount of chromatic aberration is produced, the image quality is inferior.

Thus, the conventional zoom lens systems generally have the disadvantage that the zoom ratio is low. On the other hand, the conventional zoom lens systems which have a high zoom ratio suffer from an excessively large amount of aberration and are therefore unsuitable for practical use.

SUMMARY OF THE INVENTION

In view of the above-described problems of the conventional techniques, an object of the present invention is to provide a two-unit zoom lens system having a front lens unit of positive refractive power, and a rear lens unit of negative refractive power. The zoom lens system has a reduced number of constituent lens elements, and yet provides a zoom ratio of nearly 3 and favorable performance, thereby meeting the demand for a zoom lens system having a high zoom ratio and a reduced cost.

To attain the above-described object, the present invention provides a two-unit zoom lens system having a high zoom ratio, which includes, in order from the object side, a front lens unit of positive refractive power, and a rear lens unit of negative refractive power, and in which zooming is effected by varying the spacing between the two lens units. The front lens unit has, in order from the object side, a first lens component of negative refractive power, and a second lens component of positive refractive power. The first lens component includes no positive lens element, but has at least one aspherical surface. The second lens component includes a negative lens element and a positive lens element, which are disposed in the mentioned order. The two-unit zoom lens system satisfies the following condition:

$$0.5 < f_F/f_W < 1.0 \quad (1)$$

$$0.5 < d_N/d_P < 2.0 \quad (2)$$

where $f_F$ is the focal length of the front lens unit, $f_W$ is the focal length of the whole lens system at the wide end, and $d_N$ and $d_P$ are the center thicknesses of the negative and positive lens elements, respectively, of the second lens component.

In addition, the present invention provides a two-unit zoom lens system having a high zoom ratio, which includes, in order from the object side, a front lens unit of positive refractive power, and a rear lens unit of negative refractive power, and in which zooming is effected by varying the spacing between the two lens units. The front lens unit has, in order from the object side, a first lens component of negative refractive power, and a second lens component of positive refractive power. The first lens component includes only a negative meniscus lens element having a convex surface directed toward the object side, and has at least one aspherical surface. The second lens component includes a negative lens element and a positive lens element, which are disposed in the mentioned order. The two-unit zoom lens system satisfies the following condition:

$$0.5 < f_F/f_W < 1.0 \quad (1)$$

$$-1.0 < f_W/f_{F1} < -0.18 \quad (3)$$

where $f_F$ is the focal length of the front lens unit, $f_W$ is the focal length of the whole lens system at the wide end, and $f_{F1}$ is the focal length of the first lens component.

In addition, the present invention provides a two-unit zoom lens system having a high zoom ratio, which includes, in order from the object side, a front lens unit of positive refractive power, and a rear lens unit of negative refractive power, and in which zooming is effected by varying the spacing between the two lens units. The front lens unit is composed of 3 lens elements arranged in 2 groups. That is, the front lens unit has, in order from the object side, a negative meniscus lens element having a convex surface directed toward the object side and including at least one aspherical surface, and a cemented lens composed of a negative lens element and a positive lens element. The two-unit zoom lens system satisfies the following condition:

$$0.5 < f_F/f_W < 1.0 \quad (1)$$

$$0.5 < d_N/d_P < 2.0 \quad (2)$$

where $f_F$ is the focal length of the front lens unit, $f_W$ is the focal length of the whole lens system at the wide end, and $d_N$ and $d_P$ are the center thicknesses of the negative and positive lens elements, respectively, of the cemented lens in the front lens unit.

In the above-described two-unit zoom lens systems, the rear lens unit preferably has at least one positive lens element and at least one negative lens element.

Further, the rear lens unit is preferably composed of 2 lens elements arranged in 2 groups. That is, the rear lens unit preferably has, in order from the object side, a positive meniscus lens element having a convex surface directed toward the image side, and a negative meniscus lens element having a convex surface directed toward the image side.

In the first- and second-mentioned two-unit zoom lens systems of the present invention, the spacing between the first and second lens components in the front lens unit is preferably varied during zooming.

In the third-mentioned two-unit zoom lens system of the present invention, the spacing between the negative meniscus lens element and the cemented lens in the front lens unit is preferably varied during zooming.

The spacing between the positive and negative lens elements in the rear lens unit may be varied during zooming.

Further, the condition (2) preferably satisfies the following condition:

$$0.5 < d_N/d_P < 1.5 \tag{2'}$$

In the third-mentioned two-unit zoom lens system of the present invention, it is preferable to satisfy the following condition:

$$-10.0 < f_{CE}/f_W < 0 \tag{5}$$

where $f_{CE}$ is the focal length of the cemented surface of the cemented lens.

In the first- and second-mentioned two-unit zoom lens systems of the present invention, it is preferable to satisfy the following condition:

$$0 < (r_A - r_B)/(r_A + r_B) \leq 1 \tag{4}$$

where $r_A$ and $r_B$ are the radii of curvature of the object- and image-side surfaces, respectively, of the negative lens element in the first lens component.

In the third-mentioned two-unit zoom lens system of the present invention, it is preferable to satisfy the following condition:

$$0 < (r_A - r_B)/(r_A + r_B) \leq 1 \tag{4}$$

where $r_A$ and $r_B$ are the radii of curvature of the object- and image-side surfaces, respectively, of the negative meniscus lens element in the front lens unit.

The reason for adopting the above-described arrangements in the present invention and the functions thereof will be described below.

Basically, the present invention provides a zoom lens system which has, in order from the object side, a front lens unit of positive refractive power, and a rear lens unit of negative refractive power, and in which zooming is effected by varying the spacing between the two lens units. The front lens unit has, in order from the object side, a first lens component of negative refractive power, and a second lens component of positive refractive power. The first lens component includes no positive lens element, but has at least one aspherical surface. The second lens component includes a negative lens element and a positive lens element, which are disposed in the mentioned order.

The present applicant has already proposed a zoom lens system having a relatively small number of constituent lens elements in Japanese Patent Application Laid-Open (KOKAI) No. 05-113537. In the proposed zoom lens system, the front lens unit has a first lens component of weak refractive power, and a second lens component of positive refractive power. The second lens component includes a negative lens element and a positive lens element, which are disposed in the mentioned order. The rear lens unit has a positive lens element and a negative lens element, which are disposed in the mentioned order. With this arrangement, the zoom lens system is favorably corrected for aberrations.

The reason why the refractive power of the first lens component is made weak is that a plastic material is used in order to reduce the cost, and that the effect of temperature and humidity on the plastic material must be minimized. With regard to the second lens component, a negative lens element and a positive lens element are disposed in the mentioned order in order to correct chromatic aberration even more effectively.. If the front lens unit has only two lens elements, i.e. a negative lens element and a positive lens, as in the case of Japanese Patent Application Laid-Open (KOKAI) Nos. 03-127008 and 03-158814, the variation of chromatic aberration caused by zooming cannot satisfactorily be corrected. As the zoom ratio becomes higher, the deterioration of performance due to chromatic aberration becomes an even more serious problem. For this reason, the second lens component is arranged as described above.

The same is the case with the present invention. Since the zoom ratio is raised, the arrangement of the second lens component becomes correspondingly important. In the present invention, the second lens component may be arranged by disposing a positive lens element and a negative lens element in the mentioned order. There are also conventional techniques that adopt such an arrangement for the second lens component. In such a case, however, the radii of curvature of the surfaces of the positive and negative lens elements that face each other become small. Therefore, it becomes difficult to correct higher-order aberrations produced at those surfaces. In addition, surfaces with a small curvature radius cannot efficiently be processed. Therefore, the alternative arrangement of the second lens component is also disadvantageous from the viewpoint of cost.

The object of the present invention is to achieve a high zoom ratio. If the zoom ratio is raised by using the arrangement of Japanese Patent Application Laid-Open (KOKAI) No. 05-113537, spherical aberration is aggravated at the wide end, and comatic aberration is also aggravated in the entire zoom range. An effective way of correcting these aberrations is to give negative refractive power to the first lens component.

When the above-described arrangement is adopted, it is preferable for the first lens component to include no positive lens element. If the first lens component includes a positive lens element, the positive and negative lens elements cancel each other's strong refractive powers, thereby enabling even more effective aberration correction. However, it becomes impossible to reduce the number of constituent lens elements. It is necessary in order to attain favorable aberration correction with only a negative lens element to employ at least one aspherical surface in the first lens component. In this case, it is preferable that the aspherical surface should have such a configuration that the negative refractive power of the lens becomes stronger, because such an aspherical configuration makes it possible to correct spherical and comatic aberrations.

Although it is possible to correct aberrations with the above-described arrangement, it is preferable to satisfy the following condition with a view to reducing the size of the zoom lens system:

$$0.5 < f_F/f_W < 1.0 \tag{1}$$

where $f_F$ is the focal length of the front lens unit, and $f_W$ is the focal length of the whole lens system at the wide end.

The object of the present invention is not to reduce the size of the zoom lens system. However, the condition (1) is set in order to maintain a practical size of the zoom lens system. If $f_F/f_W$ is not smaller than the upper limit of the condition (1), i.e. 1.0, the amount of movement of the lens units during zooming increases, making it difficult to achieve reduction in the camera size. In addition, the rear lens unit comes closer to the film plane at the wide end. Consequently, the external size of the rear lens unit increases, which also hinders the achievement of reduction in the camera size. On the other hand, if $f_F/f_W$ is not larger than the lower limit of the condition (1), i.e. 0.5, the refractive power of the front lens unit becomes excessively strong, so that it becomes impossible to effect favorable aberration correction with a small number of constituent lens elements.

For the second lens component, the chromatic aberration correcting action is important, as has been described above. To correct chromatic aberration effectively, it is preferable to satisfy the following condition:

$$0.5 < d_N/d_P < 2.0 \qquad (2)$$

where $d_N$ and $d_P$ are the center thicknesses of the negative and positive lens elements, respectively, of the second lens component.

The condition (2) relates to the correction of axial chromatic aberration, and it should be satisfied in order to correct variation of chromatic aberration caused by zooming. If $d_N/d_P$ is not larger than the lower limit of the condition (2), i.e. 0.5, the variation of chromatic aberration becomes large, so that it becomes impossible to attain favorable performance over the entire zoom range, from the wide end to the tele end. It becomes an even more serious problem particularly when a high zoom ratio is attained as in the case of the present invention. On the other hand, if $d_N/d_P$ is not smaller than the upper limit of the condition (2), i.e. 2.0, the negative lens element becomes unnecessarily thick, which is unfavorable for achieving reduction in the camera size. Further, absorption in the glass may cause lowering of transmittance or degradation of color reproducibility. To avoid such problems, it is even more preferable to satisfy the following condition:

$$0.5 < d_N/d_P < 1.5 \qquad (2')$$

If is preferable for the first lens component to satisfy the following condition:

$$-1.0 < f_W/f_{F1} < -0.18 \qquad (3)$$

where $f_{F1}$ is the focal length of the first lens component, and $f_W$ is the focal length of the whole lens system at the wide end.

The condition (3) relates to the refractive power of the first lens component, and it should be satisfied in order to effectively correct spherical and comatic aberrations, as described above. If $f_W/f_{F1}$ is not smaller than the upper limit of the condition, i.e −0.18, the refractive power of the first lens component becomes excessively weak, so that the aberration correcting effect becomes insufficient. If $f_W/f_{F1}$ is not larger than the lower limit of the condition (3), i.e −1.0, the refractive power of the first lens component becomes excessively strong, causing the field curvature to be aggravated. Therefore, if $f_W/f_{F1}$ is close to the lower limit of the condition (3), the first lens component preferably includes a plurality of negative lens elements. However, it is, obviously, preferable from the viewpoint of cost that the first lens component should consist of a single lens element as long as it is permitted within the range of the condition (3).

The negative lens element in the first lens component is preferably a meniscus lens element having a convex surface directed toward the object side. In the present invention, spherical and comatic aberrations are produced to a considerable extent at a surface of positive refractive power in the front lens unit that is the closest to the image side, and the aberrations produced at this surface are corrected at the image-side surface of the negative lens element in the first lens component. The object-side surface of the negative lens element is adapted to produce barrel form distortion so as to correct pincushion distortion which is produced in the rear lens unit. Accordingly, it is preferable with a view to effecting favorable aberration correction that the negative lens element in the first lens component should be a meniscus lens element having a convex surface directed toward the object side and should also satisfy the following condition:

$$0 < (r_A - r_B)/(r_A + r_B) \leq 1 \qquad (4)$$

where $r_A$ and $r_B$ are the radii of curvature of the object- and image-side surfaces, respectively, of the negative lens element in the first lens component.

The upper limit of the condition (4), i.e. 1, expresses a plano-concave configuration, whereas the lower limit of the condition (4), i.e. 0, expresses a lens configuration in which two surfaces have the same radius of curvature. Therefore, the negative lens element must fall within the range of the condition (4). If the object-side surface of the negative lens element is a concave surface, distortion produced by the surface becomes excessively large. Therefore, such an arrangement is unfavorable.

Next, the second lens component includes a negative lens element and a positive lens element. The negative and positive lens elements are preferably cemented together. When the second lens component includes a cemented lens of negative and positive lens elements, it is preferable to satisfy the following condition:

$$-10.0 < f_{CE}/f_W < 0 \qquad (5)$$

where $f_W$ is the focal length of the whole lens system at the wide end, and $f_{CE}$ is the focal length of the cemented surface of the cemented lens.

The focal length $f_{CE}$ of the cemented surface of the cemented lens is given by $$f_{CE} = r/(n'-n)$$

where r is the radius of curvature of the cemented surface, and n and n' are refractive indices of materials in front of and behind the cemented surface.

In the present invention, the first lens component is given negative refractive power to attain aberration correction, and it is preferable with a view to correcting spherical and comatic aberrations that the above-described cemented surface should also have negative refractive power. In a case where the first lens component has no refractive power as in the zoom lens system of Japanese Patent Application Laid-Open (KOKAI) No. 05-113537, filed by the present applicant, spherical aberration produced at the wide end can be corrected by providing the cemented surface with negative refractive power. Accordingly, when the zoom ratio is raised as in the case of the present invention, the condition (5) becomes even more important. If $f_{CE}/f_W$ is not smaller than the upper limit of the condition (5), i.e. 0, no refractive power is available. Accordingly, spherical and comatic aberrations are aggravated. If $f_{CE}/f_W$ is not larger than the lower limit of the condition (5), i.e. −10.0, the refractive power becomes excessively strong, making it difficult to correct higher-order aberrations.

If the negative and positive lens elements of the second lens component are air-spaced, it becomes difficult to correct higher-order aberrations produced at the air contacting surfaces, and the decentering tolerance at the time of manufacture is tightened.

The rear lens unit preferably includes, in order from the object side, at least one positive lens element, and at least one negative lens element. When the zoom ratio is raised as in the case of the present invention, each lens unit must be corrected for aberrations in order to obtain favorable performance over the entire zoom range. Therefore, the rear lens unit must be formed by combining together positive and negative lens elements.

In view of the cost, the rear lens unit preferably has a single positive lens element and a single negative lens element.

In the case of a two-unit zoom lens system having a raised zoom ratio, the curvature of field is likely to be undercorrected at the middle focal length position. However, the curvature of field at the middle focal length position can be corrected by arranging the lens system so that the spacing between the first and second lens components in the front lens unit is slightly variable, or so that the spacing between the positive and negative lens elements in the rear lens unit is variable, as shown in Examples which will be described later.

It is essential to arrange the zoom lens system of the present invention as described above. However, in view of the achievement of a high zoom ratio, high performance and low cost, the most efficient way of arranging the zoom lens system is to compose the front lens unit of 3 lens elements arranged in 2 groups, i.e. a single negative meniscus lens element having a convex surface directed toward the object side, and a cemented positive lens of a negative lens element and a positive lens element, which are disposed in the mentioned order, and to compose the rear lens unit of 2 lens elements arranged in 2 groups, i.e. a single positive meniscus lens element having a convex surface directed toward the image side, and a single negative meniscus lens element having a convex surface directed toward the image side.

If a plastic material is used, as shown in Examples (described later), the cost can be further reduced. However, plastic lenses are readily affected by changes in environmental conditions, i.e. temperature and humidity. Particularly, the effect of temperature on plastic lenses changes little by little with passage of time; therefore, great care must be taken. When a plastic material is used, it is preferable to employ a material which is less hygroscopic.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 8(a) to 8(l) graphically show various aberrations at the wide end, the standard position and the tele end in Example 1, in which: FIG. 8(a) shows spherical aberration at the wide end; FIG. 8(b) shows astigmatism at the wide end; FIG. 8(c) shows distortion at the wide end; FIG. 8(d) shows lateral chromatic aberration at the wide end; FIG. 8(e) shows spherical aberration at the standard position; FIG. 8(f) shows astigmatism at the standard position; FIG. 8(g) shows distortion at the standard position; FIG. 8(h) shows lateral chromatic aberration at the standard position; FIG. 8(i) shows spherical aberration at the tele end; FIG. 8(j) shows astigmatism at the tele end; FIG. 8(k) shows distortion at the tele end; and FIG. 8(l) shows lateral chromatic aberration at the tele end.

FIGS. 9(a) to 9(l) graphically show various aberrations in Example 2 in a similar manner to FIGS. 8(a) to 8(l).

FIGS. 10(a) to 10(l) graphically show various aberrations in Example 3 in a similar manner to FIGS. 8(a) to 8(l).

FIGS. 11(a) to 11(l) graphically show various aberrations in Example 4 in a similar manner to FIGS. 8(a) to 8(l).

FIGS. 12(a) to 12(l) graphically show various aberrations in Example 5 in a similar manner to FIGS. 8(a) to 8(l).

FIGS. 14(a) to 14(l) graphically show various aberrations in Example 7 in a similar manner to FIGS. 8(a) to 8(l).

FIGS. 15(a) to 15(l) graphically show various aberrations in Example 8 in a similar manner to FIGS. 8(a) to 8(l).

FIGS. 16(a) to 16(l) graphically show various aberrations in Example 9 in a similar manner to FIGS. 8(a) to 8(l).

FIGS. 17(a) to 17(l) graphically show various aberrations in Example 10 in a similar manner to FIGS. 8(a) to 8(l).

FIGS. 18(a) to 18(l) graphically show various aberrations in Example 11 in a similar manner to FIGS. 8(a) to 8(l).

FIGS. 19(a) to 19(l) graphically show various aberrations in Example 12 in a similar manner to FIGS. 8(a) to 8(l).

FIGS. 20(a) to 20(l) graphically show various aberrations in Example 13 in a similar manner to FIGS. 8(a) to 8(l).

DESCRIPTION OF THE PREFERRED EMBODIMENTS

Examples 1 to 13 of the two-unit zoom lens system having a high zoom ratio according to the present invention will be described below.

FIGS. 1(a) and 1(b) to 7(a) and 7(b) are sectional views showing Examples 1, 6, 8, 9, 10, 11 and 12 of the two-unit zoom lens system according to the present invention at the wide end (a) and also at the tele end (b). Since the lens layout and the moving lens unit arrangement in each of Examples 2 to 5, 7 and 13 are approximately the same as those in Example 1, illustration of these Examples is omitted. Numerical data in each Example will be described later. In all Examples, the two-unit zoom lens system has a focal length range of from 38 mm to 105 mm, i.e. a zoom ratio of 2.8.

Figure 1A:
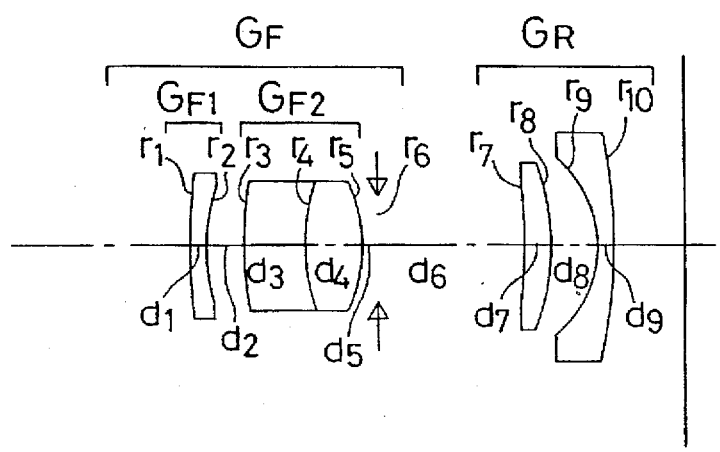
FIGS. 1(a) and 1(b) are sectional views showing Example 1 of the two-unit zoom lens system having a high zoom ratio according to the present invention at the wide end (a) and also at the tele end (b).
Figure 1B:
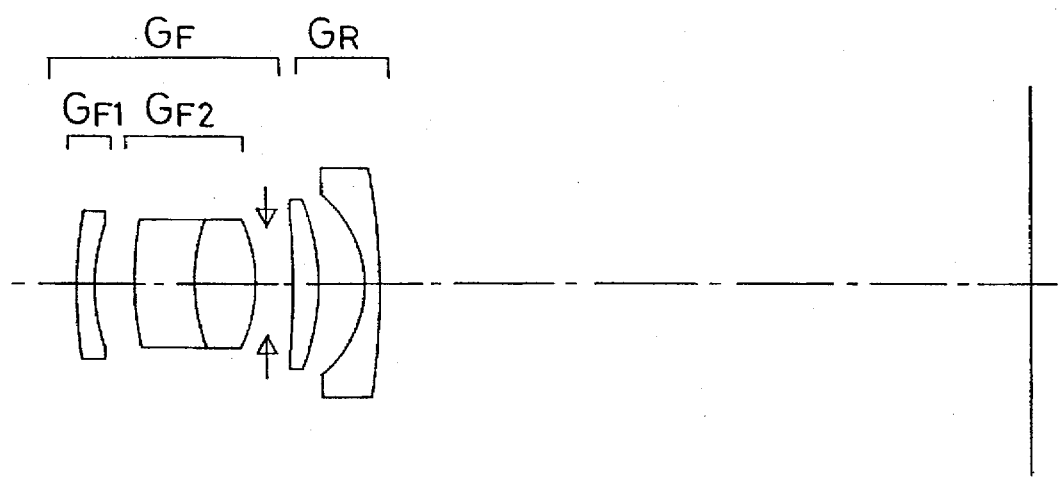

As shown in FIGS. 1(a) and 1(b), Example 1 has, in order from the object side, a front lens unit $G_F$, and a rear lens unit $G_R$. The front lens unit $G_F$ has, in order from the object side, a first lens component $G_{F1}$ which includes a negative meniscus lens element having a convex surface directed toward the object side, and a second lens component $G_{F2}$ which includes a cemented positive lens composed of a negative meniscus lens element having a convex surface directed toward the object side, and a biconvex positive lens element. The rear lens unit $G_R$ has a positive meniscus lens element having a convex surface directed toward the image side, and a negative meniscus lens element having a convex surface directed toward the image side. Example 1 has a total of 3 aspherical surfaces: the image-side surface of the first lens element; and both surfaces of the fourth lens element. In this example, the fourth lens element is a plastic lens.

Example 2 has a lens arrangement similar to that of Example 1. Example 2 has a total of 3 aspherical surfaces: the image-side surface of the first lens element; the image-side surface of the fourth lens element; and the object-side surface of the fifth lens element.

Example 3 also has a similar lens arrangement to that of Example 1. Example 3 has a total of 3 aspherical surfaces: the object-side surface of the first lens element; the image-side surface of the fourth lens element; and the object-side surface of the fifth lens element. In this example, the first and fourth lens elements are plastic lenses.

Example 4 also has a lens arrangement similar to that of Example 1. Example 4 has a total of 3 aspherical surfaces: both surfaces of the first lens element; and the object-side surface of the fourth lens element.

Example 5 also has a similar lens arrangement to that of Example 1. Example 5 has a total of 4 aspherical surfaces: both surfaces of the first lens element; the object-side surface of the fourth lens element; and the object-side surface of the fifth lens element. In this example, the fourth lens element is a plastic lens.

Figure 2A:
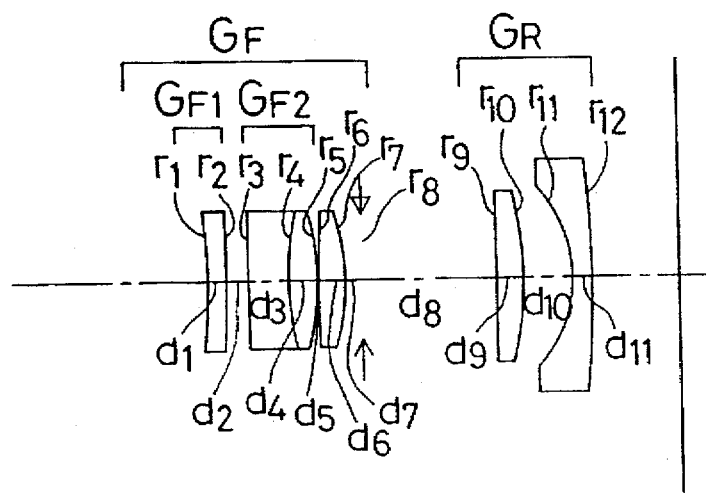
FIGS. 2(a) and 2(b) are sectional views showing Example 6 of the two-unit zoom lens system according to the present invention in a similar manner to FIGS. 1(a) and 1(b).
Figure 2B:
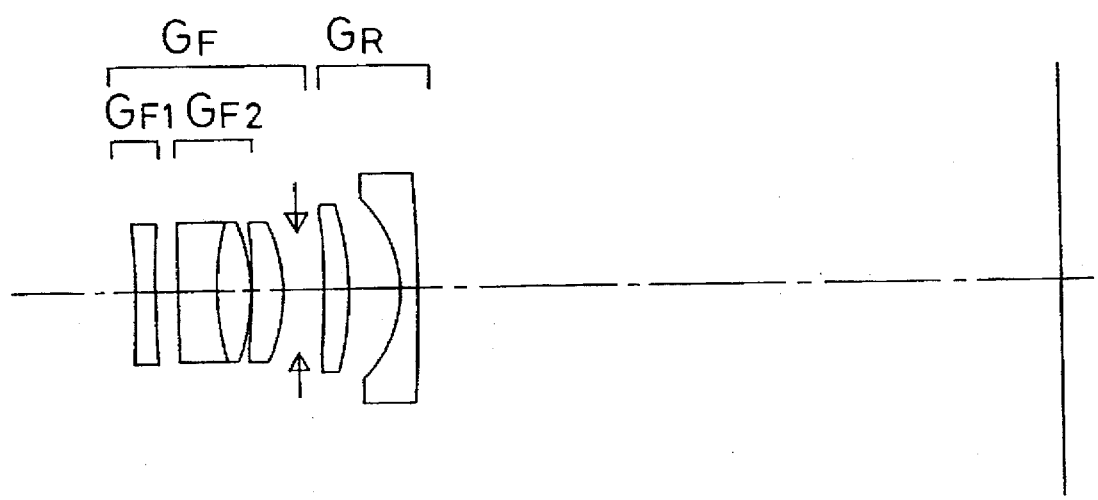

As shown in FIGS. 2(a) and 2(b), Example 6 has, in order from the object side, a front lens unit $G_F$, and a rear lens unit $G_R$. The front lens unit $G_F$ has, in order from the object side, a first lens component $G_{F1}$ which includes a negative meniscus lens element having a convex surface directed toward the object side, a second lens component $G_{F2}$ which includes a cemented positive lens composed of a biconcave negative lens element, and a biconvex positive lens element, and a positive meniscus lens element having a convex surface directed toward the image side. The rear lens unit $G_R$ has, in order from the object side, a positive meniscus lens element having a convex surface directed toward the image side, and a negative meniscus lens element having a convex surface directed toward the image side. Example 6 has a total of 5 aspherical surfaces: both surfaces of the first lens element; the image-side surface of the fourth lens element; the object-side surface of the fifth lens element; and the object-side surface of the sixth lens element. In this example, the fifth lens element is a plastic lens.

Example 7 has a lens arrangement similar to that of Example 1. Example 7 has a total of 4 aspherical surfaces: both surfaces of the first lens element; and both surfaces of the fourth lens element. In this example, the fourth lens element is a plastic lens.

Figure 3A:
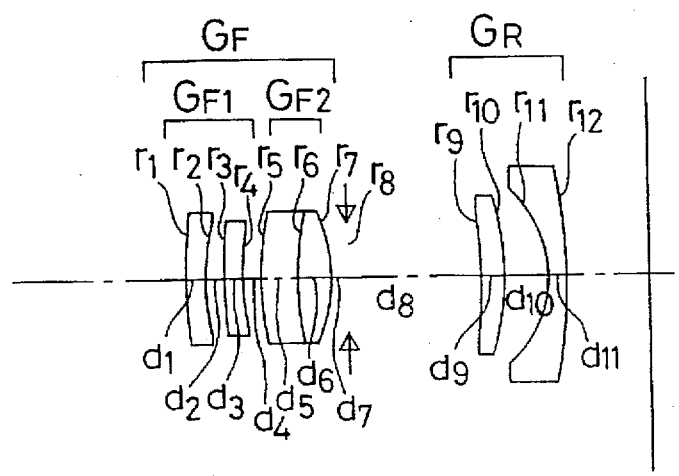
FIGS. 3(a) and 3(b) are sectional views showing Example 8 of the two-unit zoom lens system according to the present invention in a similar manner to FIGS. 1(a) and 1(b).
Figure 3B:
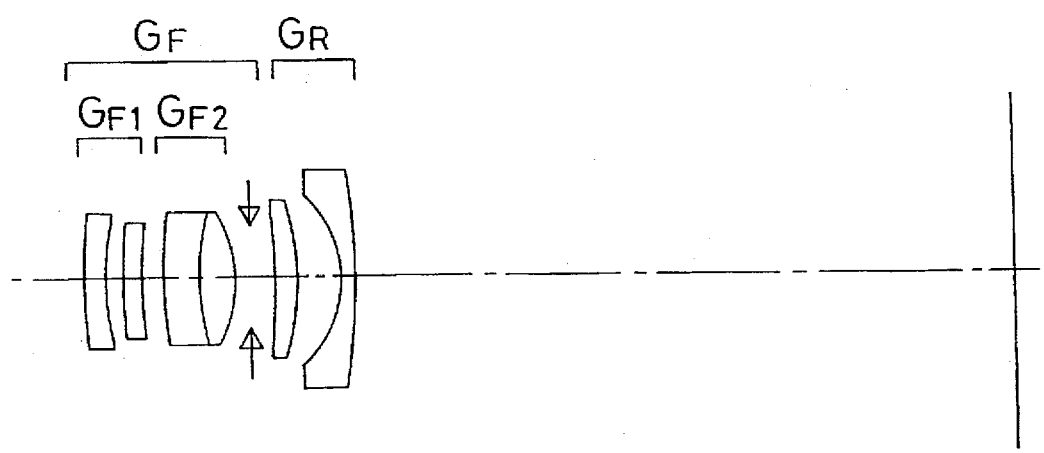

As shown in FIGS. 3(a) and 3(b), Example 8 has, in order from the object side, a front lens unit $G_F$, and a rear lens unit $G_R$. The front lens unit $G_F$ has, in order from the object side, a first lens component $G_{F1}$ which includes two negative meniscus lens elements each having a convex surface directed toward the object side, and a second lens component $G_{F2}$ which includes a cemented positive lens composed of a negative meniscus lens element having a convex surface directed toward the object side, and a biconvex positive lens element. The rear lens unit $G_R$ has, in order from the object side, a positive meniscus lens element having a convex surface directed toward the image side, and a negative meniscus lens element having a convex surface directed toward the image side. Example 8 has a total of 3 aspherical surfaces: the image-side surface of the first lens element; the image-side surface of the second lens element; and the object-side surface of the fifth lens element. In this example, the fifth lens element is a plastic lens.

Figure 4A:
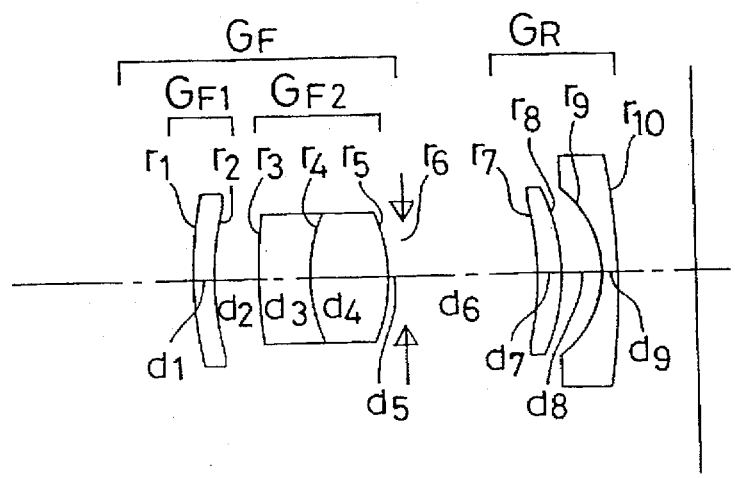
FIGS. 4(a) and 4(b) are sectional views showing Example 9 of the two-unit zoom lens system according to the present invention in a similar manner to FIGS. 1(a) and 1(b).
Figure 4B:
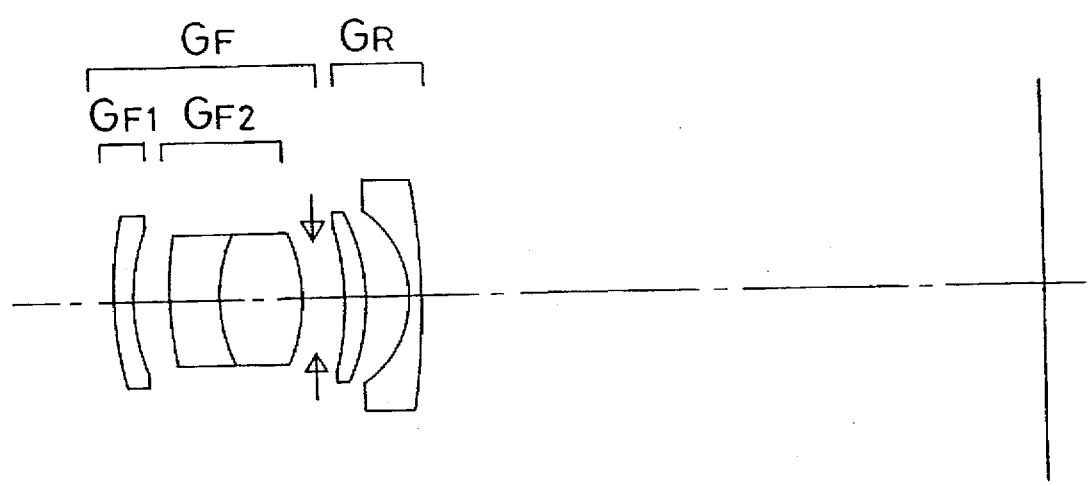

As shown in FIGS. 4(a) and 4(b), Example 9 has, in order form the object side, a front lens unit $G_F$, and a rear lens unit $G_R$. The front lens unit $G_F$ has, in order from the object side, a first lens component $G_{F1}$ which includes a negative meniscus lens element having a convex surface directed toward the object side, and a second lens component $G_{F2}$ which includes a cemented positive lens composed of a negative meniscus lens element having a convex surface directed toward the object side, and a biconvex positive lens element. The rear lens unit $G_R$ has, in order from the object side, a positive meniscus lens element having a convex surface directed toward the image side, and a negative meniscus lens element having a convex surface directed toward the image side. Example 9 has a total of 3 aspherical surfaces: the object-side surface of the first lens element; the object-side surface of the second lens element; and the object-side surface of the fourth lens element. In this example, the fourth lens element is a plastic lens. During zooming, the spacing between the first and second lens elements slightly changes.

Figure 5A:
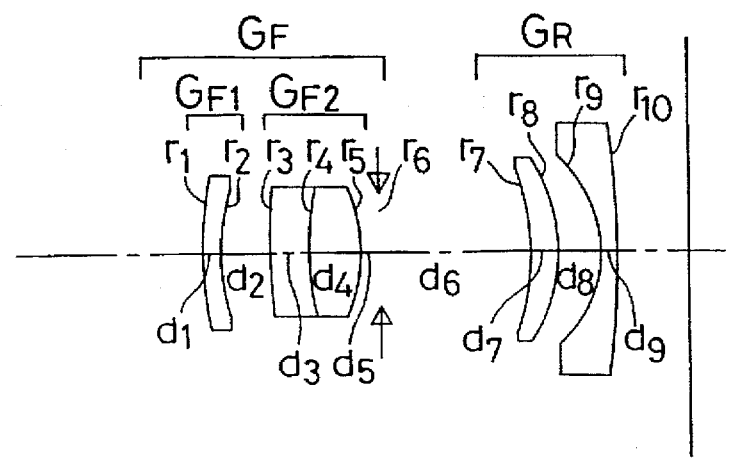
FIGS. 5(a) and 5(b) are sectional views showing Example 10 of the two-unit zoom lens system according to the present invention in a similar manner to FIGS. 1(a) and 1(b).
Figure 5B:
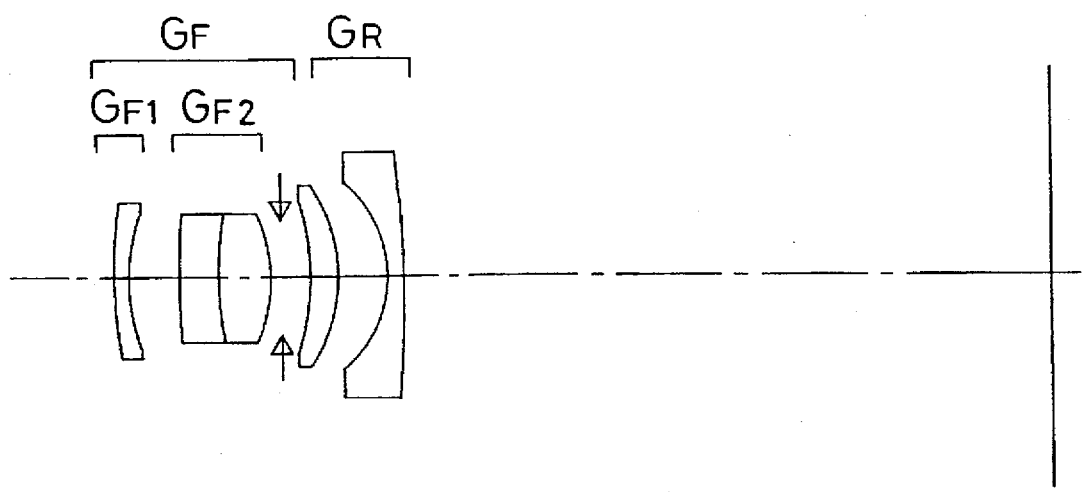

As shown in FIGS. 5(a) and 5(b), Example 10 has, in order from the object side, a front lens unit $G_F$, and a rear lens unit $G_R$. The front lens unit $G_F$ has, in order from the object side, a first lens component $G_{F1}$ which includes a negative meniscus lens element having a convex surface directed toward the object side, and a second lens component $G_{F2}$ which includes a cemented positive lens composed of a negative meniscus lens element having a convex surface directed toward the object side, and a biconvex positive lens element. The rear lens unit $G_R$ has, in order from the object side, a positive meniscus lens element having a convex surface directed toward the image side, and a negative meniscus lens element having a convex surface directed toward the image side. Example 10 has a total of 4 aspherical surfaces: the object-side surface of the first lens element; the object-side surface of the second lens element; the object-side surface of the fourth lens element; and the object-side surface of the fifth lens element. In this example, the fourth lens element is a plastic lens. During zooming, the spacing between the first and second lens elements and the spacing between the fourth and fifth lens elements slightly change.

Figure 6A:
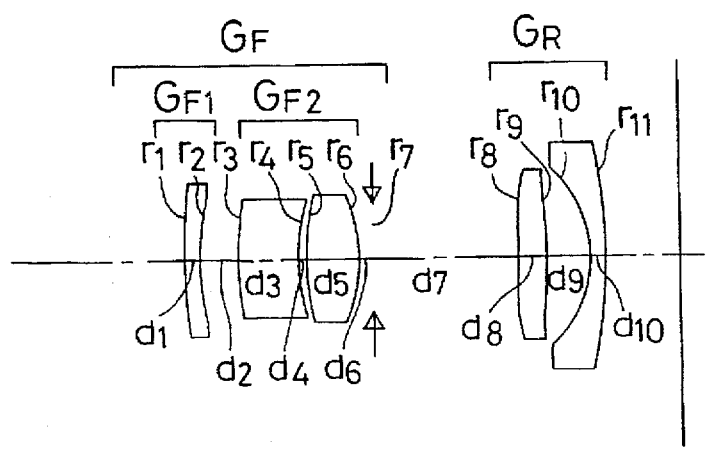
FIGS. 6(a) and 6(b) are sectional views showing Example 11 of the two-unit zoom lens system according to the present invention in a similar manner to FIGS. 1(a) and 1(b).
Figure 6B:
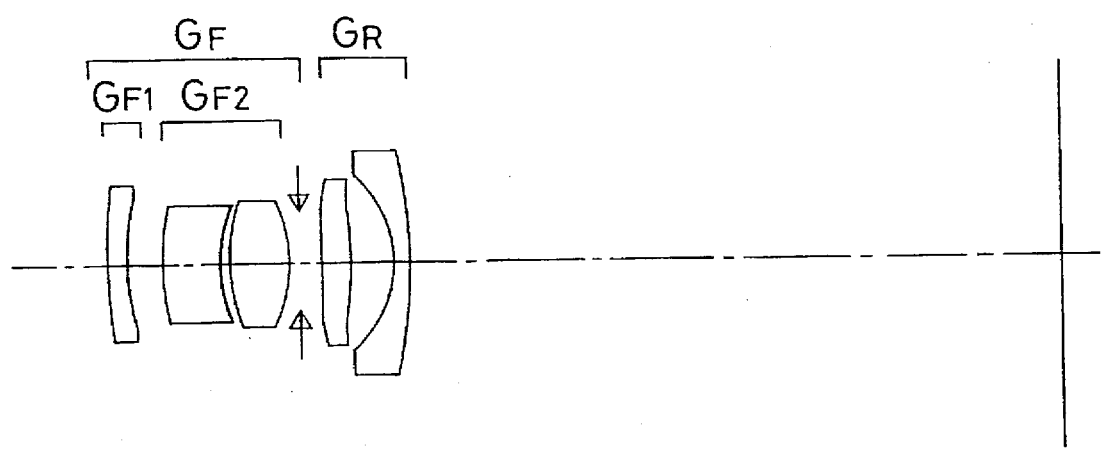

As shown in FIGS. 6(a) and 6(b), Example 11 has, in order from the object side, a front lens unit $G_F$, and a rear lens unit $G_R$. The front lens unit $G_F$ has, in order from the object side, a first lens component $G_{F1}$ which includes a negative meniscus lens element having a convex surface directed toward the object side, and a second lens component $G_{F2}$ which includes a negative meniscus lens element having a convex surface directed toward the object side, and a biconvex positive lens element. The rear lens unit $G_R$ has, in order from the object side, a positive meniscus lens element having a convex surface directed toward the image side, and a negative meniscus lens element having a convex surface directed toward the image side. Example 11 has a total of 3 aspherical surfaces: the image-side surface of the first lens element; and both surfaces of the fourth lens element. In this example, the fourth lens element is a plastic lens.

Figure 7A:
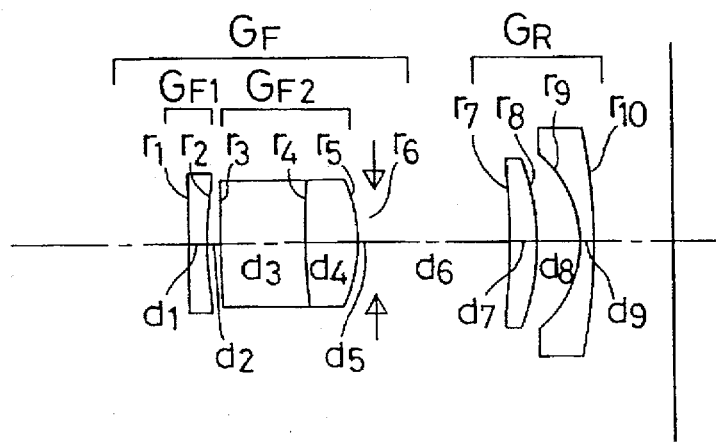
FIGS. 7(a) and 7(b) are sectional views showing Example 12 of the two-unit zoom lens system according to the present invention in a similar manner to FIGS. 1(a) and 1(b).
Figure 7B:
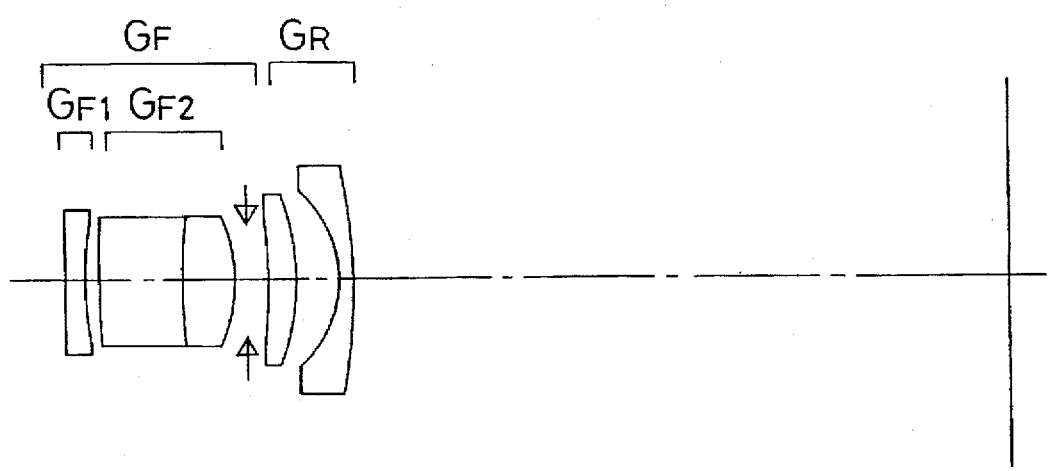
Figure 13A:
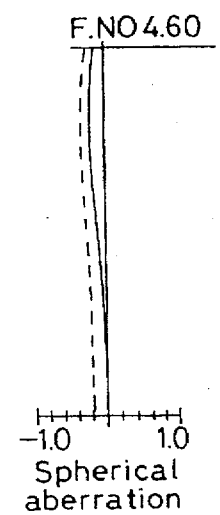
FIGS. 13(a) to 13(l) graphically show various aberrations in Example 6 in a similar manner to FIGS. 8(a) to 8(l).
Figure 13B:
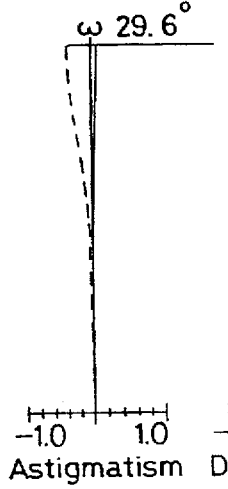
Figure 13C:
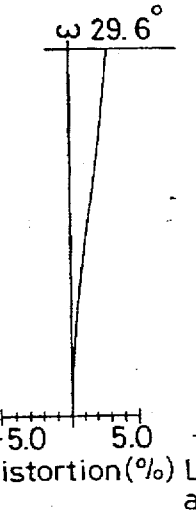
Figure 13D:
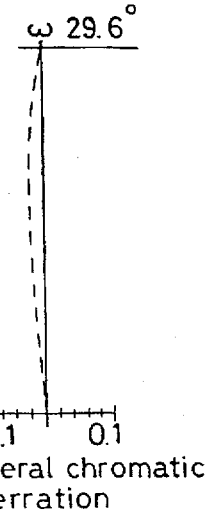
Figure 13E:
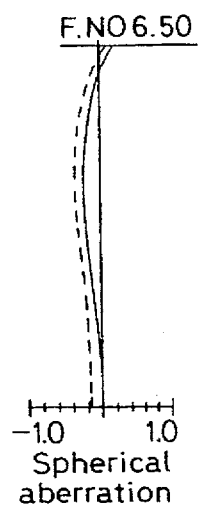
Figure 13F:
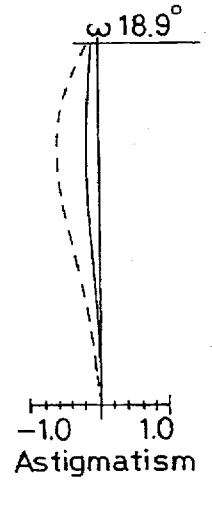
Figure 13G:
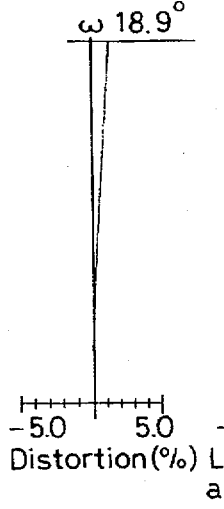
Figure 13H:
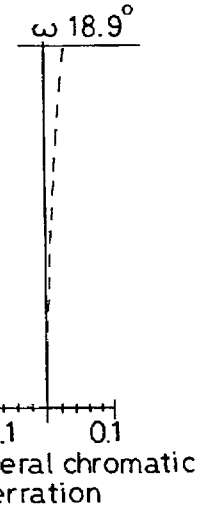
Figure 13I:
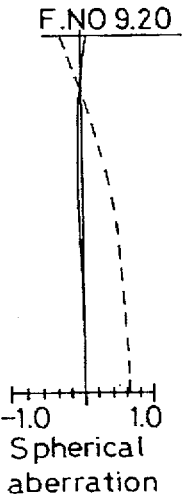
Figure 13J:
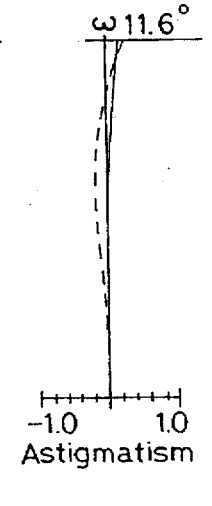
Figure 13K:
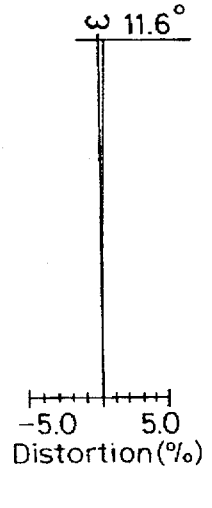
Figure 13L:
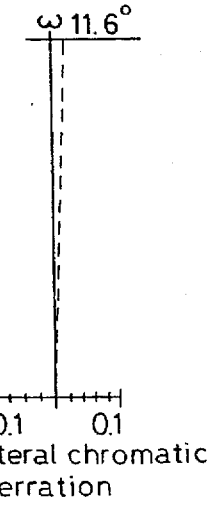

As shown in FIGS. 7(a) and 7(b), Example 12 has, in order from the object side, a front lens unit $G_F$, and a rear lens unit $G_R$. The front lens unit $G_F$ has, in order from the object side, a first lens component $G_{F1}$ which includes a negative lens element having a plane surface at the object side thereof, and a second lens component $G_{F2}$ which includes a cemented positive lens composed of a negative meniscus lens element having a convex surface directed toward the object side, and a biconvex positive lens element. The rear lens unit $G_R$ has, in order from the object side, a positive meniscus lens element having a convex surface directed toward the image side, and a negative meniscus lens element having a convex surface directed toward the image side. Example 12 has a total of 2 aspherical surfaces: the image-side surface of the first lens element; and the object-side surface of the fourth lens element. In this example, the fourth lens element is a plastic lens.

Example 13 has a lens arrangement similar to that of Example 1. Example 13 has a total of 2 aspherical surfaces: the object-side surface of the first lens element; and the object-side surface of the fourth lens element. In this example, the first and fourth lens elements are plastic lenses.

In any of the above-described Examples, a stop is disposed behind the front lens unit $G_F$ and adapted to move together with the front lens unit $G_F$ during zooming. It should be noted that it is easy to arrange the system so that the stop is movable independently. However, such an arrangement is unfavorable because the mechanism becomes complicated.

Numerical data in Examples will be shown below. In the following, reference symbol f denotes the focal length of the entire system, $F_{NO}$ is F-number, $2\omega$ is the view angle, $f_B$ is the back focus, $r_1, r_2 \ldots$ are the curvature radii of lens surfaces, $d_1, d_2 \ldots$ are the spacings between adjacent lens surfaces, $n_{d1}, n_{d2} \ldots$ are the refractive indices of the lenses for the spectral d-line, and $v_{d1}, v_{d2} \ldots$ are the Abbe's numbers of the lenses. Assuming that the light traveling direction along the optical axis is x and a direction perpendicular to the optical axis is y, the aspherical configuration is expressed by $$x=(y^2/r)[1+\{1-P(y/r)^2\}^{1/2}]+A_4 y^4+A_6 y^6+A_8 y^8+A_{10} y^{10}+A_{12} y^{12}$$

where r is the paraxial curvature radius; P is a conical coefficient; and $A_4, A_6, A_8, A_{10}$ and $A_{12}$ are aspherical coefficients.

EXAMPLE 1

$f=38.0\sim63.0\sim105.0$ $F_{NO}=4.6\sim6.5\sim9.2$ $2\omega=59.2\sim37.8\sim23.2°$ $f_B=8.2\sim32.5\sim73.5$

| $r_1 = 100.0380$ | $d_1 = 2.000$ | $n_{d1} = 1.74100$ | $v_{d1} = 52.68$ |
|---|---|---|---|
| $r_2 = 28.2960$ (Aspheric) | $d_2 = 4.300$ | | |
| $r_3 = 43.3630$ | $d_3 = 6.600$ | $n_{d2} = 1.75520$ | $v_{d2} = 27.51$ |
| $r_4 = 20.9160$ | $d_4 = 6.900$ | $n_{d3} = 1.60311$ | $v_{d3} = 60.70$ |
| $r_5 = -15.8860$ | $d_5 = 1.000$ | | |
| $r_6 = \infty$ (Stop) | $d_6 =$ (Variable) | | |
| $r_7 = -53.5410$ (Aspheric) | $d_7 = 3.000$ | $n_{d4} = 1.58423$ | $v_{d4} = 30.49$ |
| $r_8 = -27.4550$ (Aspheric) | $d_8 = 5.100$ | | |
| $r_9 = -12.2700$ | $d_9 = 1.800$ | $n_{d5} = 1.72916$ | $v_{d5} = 54.68$ |
| $r_{10} = -64.5930$ | | | |

Zooming Spaces

| f | 38.0 | 63.0 | 105.0 |
|---|---|---|---|
| $d_6$ | 16.9740 | 8.2830 | 2.9990 |

Aspherical Coefficients
2nd surface

P=1.0000

$A_4=0.62014\times10^{-4}$ $A_6=0.38023\times10^{-6}$ $A_8=0.10307\times10^{-8}$ $A_{10}=0.36000\times10^{-10}$ 7th surface

P=1.0000

$A_4=0.38825\times10^{-4}$ $A_6=0.13055\times10^{-6}$ $A_8=-0.64444\times10^{-9}$ $A_{10}=0.28119\times10^{-10}$ 8th surface

P=1.0000

$A_4=0.39882\times10^{-5}$ $A_6=0.84194\times10^{-7}$ $A_8=-0.35484\times10^{-8}$ $A_{10}=0.40564\times10^{-10}$

EXAMPLE 2

$f=38.0\sim63.0\sim105.0$ $F_{NO}=4.6\sim6.5\sim9.2$ $2\omega=59.2\sim37.8\sim23.2°$ $f_B=9.0\sim32.6\sim72.3$

| $r_1 = 499.9860$ | $d_1 = 2.000$ | $n_{d1} = 1.72916$ | $v_{d1} = 54.68$ |
|---|---|---|---|
| $r_2 = 50.5330$ (Aspheric) | $d_2 = 7.400$ | | |
| $r_3 = 39.3960$ | $d_3 = 3.300$ | $n_{d2} = 1.74950$ | $v_{d2} = 35.27$ |
| $r_4 = 15.1840$ | $d_4 = 4,800$ | $n_{d3} = 1.56873$ | $v_{d3} = 63.16$ |
| $r_5 = -15.6000$ | $d_5 = 1.000$ | | |
| $r_6 = \infty$ (Stop) | $d_6 =$ (Variable) | | |
| $r_7 = -29.9450$ | $d_7 = 3.000$ | $n_{d4} = 1.59270$ | $v_{d4} = 35.29$ |
| $r_8 = -16.5360$ (Aspheric) | $d_8 = 4.600$ | | |
| $r_9 = -12.8280$ (Aspheric) | $d_9 = 1,800$ | $n_{d5} = 1.72916$ | $v_{d5} = 54.68$ |
| $r_{10} = -7934.8540$ | | | |

Zooming Spaces

| f | 38.0 | 63.0 | 105.0 |
|---|---|---|---|
| $d_6$ | 16.0160 | 7.9200 | 2.9980 |

Aspherical Coefficients
2nd surface

P=1.0000

$A_4=0.60247\times10^{-4}$ $A_6=0.32070\times10^{-6}$ $A_8=0.21796\times10^{-8}$ $A_{10}=0.18187\times10^{-10}$ 8th surface

P=1.0000

$A_4=0.26152\times10^{-4}$ $A_6=0.12906\times10^{-7}$ $A_8=-0.38766\times10^{-8}$ $A_{10}=-0.33578\times10^{-10}$ 9th surface

P=0.7197

$A_4=0.35768\times10^{-4}$ $A_6=0.45065\times10^{-7}$ $A_8=-0.26649\times10^{-8}$ $A_{10}=0.18856\times10^{-10}$

EXAMPLE 3 f=38.0~63.0~105.0

$F_{NO}$=4.6~6.5~9.2

2ω=59.2~37.8~23.2°

$f_B$=7.5~29.3~65.9

| | | | |
|---|---|---|---|
| $r_1$ = 24.7850 (Aspheric) | $d_1$ = 2.000 | $n_{d1}$ = 1.49241 | $v_{d1}$ = 57.66 |
| $r_2$ = 19.1640 | $d_2$ = 7.400 | | |
| $r_3$ = 55.9210 | $d_3$ = 2.500 | $n_{d2}$ = 1.80100 | $v_{d2}$ = 34.97 |
| $r_4$ = 16.6340 | $d_4$ = 4.500 | $n_{d3}$ = 1.56873 | $v_{d3}$ = 63.16 |
| $r_5$ = −14.8900 | $d_5$ = 1.000 | | |
| $r_6$ = ∞ (Stop) | $d_6$ = (Variable) | | |
| $r_7$ = −30.2210 | $d_7$ = 3.000 | $n_{d4}$ = 1.58423 | $v_{d4}$ = 30.49 |
| $r_8$ = −16.5190 (Aspheric) | $d_8$ = 4.400 | | |
| $r_9$ = −12.0660 (Aspheric) | $d_9$ = 1.800 | $n_{d5}$ = 1.72916 | $v_{d5}$ = 54.68 |
| $r_{10}$ = −433.6210 | | | |

Zooming Spaces

| f | 38.0 | 63.0 | 105.0 |
|---|---|---|---|
| $d_6$ | 15.6420 | 7.7800 | 3.0010 |

Aspherical Coefficients
1st surface

P=1.0000

$A_4=-0.70329\times10^{-4}$ $A_6=-0.41684\times10^{-6}$ $A_8=-0.32158\times10^{-8}$ $A_{10}=0.11176\times10^{-10}$ 8th surface

P=1.0000

$A_4=0.16943\times10^{-4}$ $A_6=-0.36350\times10^{-6}$ $A_8=0.18387\times10^{-8}$ $A_{10}=0$ 9th surface

P=0.6686

$A_4=0.32667\times10^{-4}$ $A_6=-0.26635\times10^{-6}$ $A_8=0.19666\times10^{-8}$ $A_{10}=0$

EXAMPLE 4 f=38.0~63.0~105.0

$F_{NO}$=4.6~6.5~9.2

2ω=59.2~37.8~23.2°

$f_B$=8.0~30.4~68.0

| | | | |
|---|---|---|---|
| $r_1$ = 200.0000 (Aspheric) | $d_1$ = 2.000 | $n_{d1}$ = 1.72916 | $v_{d1}$ = 54.68 |
| $r_2$ = 40.5850 (Aspheric) | $d_2$ = 4.500 | | |
| $r_3$ = 32.2370 | $d_3$ = 2.500 | $n_{d2}$ = 1.83400 | $v_{d2}$ = 37.16 |
| $r_4$ = 14.1880 | $d_4$ = 8.800 | $n_{d3}$ = 1.58913 | $v_{d3}$ = 61.18 |
| $r_5$ = −15.3660 | $d_5$ = 1.000 | | |
| $r_6$ = ∞ (Stop) | $d_6$ = (Variable) | | |
| $r_7$ = −44.8600 (Aspheric) | $d_7$ = 3.000 | $n_{d4}$ = 1.67270 | $v_{d4}$ = 32.10 |
| $r_8$ = −32.7280 | $d_8$ = 5.900 | | |
| $r_9$ = −10.9800 | $d_9$ = 1.800 | $n_{d5}$ = 1.72916 | $v_{d5}$ = 54.68 |
| $r_{10}$ = −39.7070 | | | |

Zooming Spaces

| f | 38.0 | 63.0 | 105.0 |
|---|---|---|---|
| $d_6$ | 14.5070 | 7.3500 | 2.9980 |

Aspherical Coefficients
1st surface

P=1.0000

$A_4=-0.36806\times10^{-4}$ $A_6=0.34409\times10^{-6}$ $A_8=-0.14305\times10^{-8}$ $A_{10}=-0.11082\times10^{-10}$ 2nd surface

P=1.0000

$A_4=0.22806\times10^{-4}$ $A_6=0.72680\times10^{-6}$ $A_8=0.94648\times10^{-9}$ $A_{10}=-0.12305\times10^{-10}$ 7th surface

P=0.10000

$A_4=0.44567\times10^{-4}$ $A_6=0.14847\times10^{-6}$ $A_8=0.38848\times10^{-8}$ $A_{10}=-0.23640\times10^{-10}$

EXAMPLE 5 f=38.0~63.0~105.0

$F_{NO}$=4.6~6.5~9.2

2ω=59.2~37.8~23.2°

$f_B$=8.7~33.1~74.1

| | | | |
|---|---|---|---|
| $r_1 = 1394.1330$ (Aspheric) | $d_1 = 2.000$ | $n_{d1} = 1.72916$ | $\nu_{d1} = 54.68$ |
| $r_2 = 44.6440$ (Aspheric) | $d_2 = 5.300$ | | |
| $r_3 = 56.1560$ | $d_3 = 4.700$ | $n_{d2} = 1.76182$ | $\nu_{d2} = 26.52$ |
| $r_4 = 25.2790$ | $d_4 = 4.500$ | $n_{d3} = 1.56873$ | $\nu_{d3} = 63.16$ |
| $r_5 = -14.3070$ | $d_5 = 1.000$ | | |
| $r_6 = \infty$ (Stop) | $d_6 =$ (Variable) | | |
| $r_7 = -38.5490$ (Aspheric) | $d_7 = 3.000$ | $n_{d4} = 1.58423$ | $\nu_{d4} = 30.49$ |
| $r_8 = -21.6980$ | $d_8 = 5.000$ | | |
| $r_9 = -12.4410$ (Aspheric) | $d_9 = 1.800$ | $n_{d5} = 1.72916$ | $\nu_{d5} = 54.68$ |
| $r_{10} = -88.5070$ | | | |

Zooming Spaces

| f | 38.0 | 63.0 | 105.0 |
|---|---|---|---|
| $d_6$ | 16.4860 | 8.0990 | 3.0000 |

Aspherical Coefficients
1st surface

P=1.0000

$A_4 = 0.17260 \times 10^{-4}$ $A_6 = 0.25263 \times 10^{-6}$ $A_8 = -0.45071 \times 10^{-8}$ $A_{10} = 0.74162 \times 10^{-11}$ 2nd surface

P=1.0000

$A_4 = 0.98923 \times 10^{-4}$ $A_6 = 0.80122 \times 10^{-6}$ $A_8 = -0.43554 \times 10^{-9}$ $A_{10} = 0.22974 \times 10^{-10}$ 7th surface

P=0.9982

$A_4 = 0.20309 \times 10^{-4}$ $A_6 = 0.89655 \times 10^{-7}$ $A_8 = 0.29179 \times 10^{-8}$ $A_{10} = -0.25810 \times 10^{-10}$ 9th surface

P=0.7826

$A_4 = -0.40955 \times 10^{-5}$ $A_6 = -0.54380 \times 10^{-7}$ $A_8 = -0.16811 \times 10^{-8}$ $A_{10} = 0.96896 \times 10^{-11}$

EXAMPLE 6 f=38.0~63.0~105.0

$F_{NO}$=4.6~6.5~9.2

$2\omega$=59.2~37.8~23.2°

$f_B$=8.8~30.1~66.0

| | | | |
|---|---|---|---|
| $r_1 = 169.4700$ (Aspheric) | $d_1 = 2.000$ | $n_{d1} = 1.72916$ | $\nu_{d1} = 54.68$ |
| $r_2 = 65.9460$ (Aspheric) | $d_2 = 2.500$ | | |
| $r_3 = -367.4880$ | $d_3 = 4.000$ | $n_{d2} = 1.80100$ | $\nu_{d2} = 34.97$ |
| $r_4 = 22.8220$ | $d_4 = 3.200$ | $n_{d3} = 1.56873$ | $\nu_3 = 63.16$ |
| $r_5 = -24.4720$ | $d_5 = 0.200$ | | |
| $r_6 = -165.8500$ | $d_6 = 3.000$ | $n_{d4} = 1.56883$ | $\nu_{d4} = 56.34$ |
| $r_7 = -17.6400$ (Aspheric) | $d_7 = 1.000$ | | |
| $r_8 = \infty$ (Stop) | $d_8 =$ (Variable) | | |
| $r_9 = -85.8610$ (Aspheric) | $d_9 = 3.000$ | $n_{d5} = 1.58423$ | $\nu_{d5} = 30.49$ |
| $r_{10} = -31.3410$ | $d_{10} = 5.000$ | | |
| $r_{11} = -11.6040$ (Aspheric) | $d_{11} = 1.800$ | $n_{d6} = 1.72916$ | $\nu_{d6} = 54.68$ |
| $r_{12} = -137.1230$ | | | |

Zooming Spaces

| f | 38.0 | 63.0 | 105.0 |
|---|---|---|---|
| $d_8$ | 13.9240 | 7.1300 | 2.9990 |

Aspherical Coefficients
1st surface

P=1.0000

$A_4 = -0.20684 \times 10^{-3}$ $A_6 = -0.43984 \times 10^{-6}$ $A_8 = 0.67556 \times 10^{-8}$ $A_{10} = 0.13382 \times 10^{-10}$ 2nd surface

P=1.0000

$A_4 = -0.14901 \times 10^{-3}$ $A_6 = 0.26974 \times 10^{-7}$ $A_8 = 0.94091 \times 10^{-8}$ $A_{10} = -0.15874 \times 10^{-10}$ 7th surface

P=1.0000

$A_4 = -0.85809 \times 10^{-5}$ $A_6 = 0.73875 \times 10^{-7}$ $A_8 = -0.62773 \times 10^{-9}$ $A_{10} = 0$ 9th surface

P=1.0000

$A_4 = 0.35461 \times 10^{-4}$ $A_6 = 0.34989 \times 10^{-6}$ $A_8 = 0.46153 \times 10^{-9}$ $A_{10} = 0$ 11th surface

P=1.1237

$A_4=0.27011\times10^{-4}$ $A_6=0.23684\times10^{-7}$ $A_8=0.15315\times10^{-8}$ $A_{10}=0$

EXAMPLE 7

$f=38.0\sim63.0\sim105.0$ $F_{NO}=4.6\sim6.5\sim9.2$ $2\omega=59.2\sim37.8\sim23.2°$ $f_B=9.0\sim33.3\sim74.0$

| | | | |
|---|---|---|---|
| $r_1 = 1000.0000$ (Aspheric) | $d_1 = 2.000$ | $n_{d1} = 1.72916$ | $\nu_{d1} = 54.68$ |
| $r_2 = 38.2810$ (Aspheric) | $d_2 = 3.900$ | | |
| $r_3 = 47.3810$ | $d_3 = 6.500$ | $n_{d2} = 1.78472$ | $\nu_{d2} = 25.68$ |
| $r_4 = 22.8560$ | $d_4 = 6.300$ | $n_{d3} = 1.58913$ | $\nu_{d3} = 61.18$ |
| $r_5 = -14.6320$ | $d_5 = 1.000$ | | |
| $r_6 = \infty$ (Stop) | $d_6 =$ (Variable) | | |
| $r_7 = -52.1260$ (Aspheric) | $d_7 = 3.000$ | $n_{d4} = 1.58423$ | $\nu_{d4} = 30.49$ |
| $r_8 = -24.4930$ (Aspheric) | $d_8 = 4.700$ | | |
| $r_9 = -12.0570$ | $d_9 = 1.800$ | $n_{d5} = 1.72916$ | $\nu_{d5} = 54.68$ |
| $r_{10} = -83.0590$ | | | |

Zooming Spaces

| f | 38.0 | 63.0 | 105.0 |
|---|---|---|---|
| $d_6$ | 16.3160 | 8.0350 | 3.0010 |

Aspherical Coefficients
1st surface $P=1.0000$ $A_4=0.40579\times10^{-4}$ $A_6=-0.11944\times10^{-6}$ $A_8=0.70422\times10^{-9}$ $A_{10}=-0.19634\times10^{-10}$ 2nd surface $P=1.0000$ $A_4=0.11863\times10^{-3}$ $A_6=0.42109\times10^{-6}$ $A_8=0.38284\times10^{-8}$ $A_{10}=-0.56697\times10^{-13}$ 7th surface $P=1.0000$ $A_4=0.24523\times10^{-4}$ $A_6=-0.68471\times10^{-8}$ $A_8=0.18336\times10^{-8}$ $A_{10}=0$ 8th surface $P=1.0000$ $A_4=-0.10844\times10^{-4}$ $A_6=-0.16930\times10^{-6}$ $A_8=0.78241\times10^{-9}$ $A_{10}=0$

EXAMPLE 8

$f=38.0\sim63.0\sim105.0$ $F_{NO}=4.6\sim6.5\sim9.2$ $2\omega=59.2\sim37.8\sim23.2°$ $f_B=9.5\sim33.7\sim74.3$

| | | | |
|---|---|---|---|
| $r_1 = 117.8170$ | $d_1 = 2.000$ | $n_{d1} = 1.79952$ | $\nu_{d1} = 42.24$ |
| $r_2 = 38.8280$ (Aspheric) | $d_2 = 2.200$ | | |
| $r_3 = 109.0840$ | $d_3 = 2.000$ | $n_{d2} = 1.77250$ | $\nu_{d2} = 49.66$ |
| $r_4 = 45.6280$ (Aspheric) | $d_4 = 2.100$ | | |
| $r_5 = 42.3750$ | $d_5 = 4.000$ | $n_{d3} = 1.78472$ | $\nu_{d3} = 25.68$ |
| $r_6 = 25.4370$ | $d_6 = 4.300$ | $n_{d4} = 1.58913$ | $\nu_{d4} = 61.18$ |
| $r_7 = -13.6420$ | $d_7 = 1.000$ | | |
| $r_8 = \infty$ (Stop) | $d_8 =$ (Variable) | | |
| $r_9 = -59.4180$ (Aspheric) | $d_9 = 3.000$ | $n_{d5} = 1.58423$ | $\nu_{d5} = 30.49$ |
| $r_{10} = -28.8150$ | $d_{10} = 4.800$ | | |
| $r_{11} = -11.6090$ | $d_{11} = 1.800$ | $n_{d6} = 1.72916$ | $\nu_{d6} = 54.68$ |
| $r_{12} = -59.8180$ | | | |

Zooming Spaces

| f | 38.0 | 63.0 | 105.0 |
|---|---|---|---|
| $d_8$ | 15.3710 | 7.6770 | 3.0000 |

Aspherical Coedfficients
2nd surface $P=1.0000$ $A_4=0.78327\times10^{-4}$ $A_6=0.52404\times10^{-6}$ $A_8=0.38890\times10^{-8}$ $A_{10}=0.95570\times10^{-10}$ 4th surface $P=1.0000$ $A_4=0.10479\times10^{-4}$ $A_6=0.14923\times10^{-6}$ $A_8=-0.24657\times10^{-8}$ $A_{10}=-0.54965\times10^{-11}$ 9th surface $P=1.0000$ $A_4=0.42550\times10^{-4}$ $A_6=0.25721\times10^{-6}$ $A_8=0.56118\times10^{-9}$ $A_{10}=0$

EXAMPLE 9

$f=38.0\sim63.0\sim105.0$ $F_{NO}=4.6\sim6.5\sim9.2$ $2\omega=59.2\sim37.8\sim23.2°$ $f_B=7.8\sim29.8\sim66.4$

| | | | |
|---|---|---|---|
| $r_1 = 31.3440$ (Aspheric) | $d_1 = 2.000$ | $n_{d1} = 1.77250$ | $v_{d1} = 49.66$ |
| $r_2 = 23.9580$ | $d_2 =$ (Variable) | | |
| $r_3 = 51.9140$ (Aspheric) | $d_3 = 5.600$ | $n_{d2} = 1.80100$ | $v_{d2} = 34.97$ |
| $r_4 = 17.0290$ | $d_4 = 8.700$ | $n_{d3} = 1.58913$ | $v_{d3} = 61.18$ |
| $r_5 = -15.0130$ | $d_5 = 1.000$ | | |
| $r_6 = \infty$ (Stop) | $d_6 =$ (Variable) | | |
| $r_7 = -31.0380$ (Aspheric) | $d_7 = 3.000$ | $n_{d4} = 1.58423$ | $v_{d4} = 30.49$ |
| $r_8 = -20.0070$ | $d_8 = 4.100$ | | |
| $r_9 = -11.1750$ | $d_9 = 1.800$ | $n_{d5} = 1.72916$ | $v_{d5} = 54.68$ |
| $r_{10} = -59.9140$ | | | |

Zooming Spaces

| f | 38.0 | 63.0 | 105.0 |
|---|---|---|---|
| $d_2$ | 5.1190 | 4.7490 | 4.0390 |
| $d_6$ | 14.5250 | 7.3440 | 3.0010 |

Aspherical Coefficients
1st surface

P=1.0000

$A_4=-0.29112\times10^{-4}$ $A_6=-0.11599\times10^{-6}$ $A_8=-0.82790\times10^{-11}$ $A_{10}=-0.31108\times10^{-11}$ 3rd surface

P=1.0000

$A_4=-0.16290\times10^{-4}$ $A_6=-0.14660\times10^{-6}$ $A_8=-0.25472\times10^{-8}$ $A_{10}=0.16873\times10^{-10}$ 7th surface

P=1.0000

$A_4=0.47629\times10^{-4}$ $A_6=0.37829\times10^{-6}$ $A_8=0.73249\times10^{-9}$ $A_{10}=0$

EXAMPLE 10

$f=38.0\sim63.0\sim105.0$ $F_{NO}=4.6\sim6.5\sim9.2$ $2\omega=59.2\sim37.8\sim23.2°$ $f_B=7.5\sim30.5\sim69.0$

| | | | |
|---|---|---|---|
| $r_1 = 30.7900$ (Aspheric) | $d_1 = 2.000$ | $n_{d1} = 1.72916$ | $v_{d1} = 54.68$ |
| $r_2 = 21.5390$ | $d_2 =$ (Variable) | | |
| $r_3 = 83.3460$ (Aspheric) | $d_3 = 4.000$ | $n_{d2} = 1.80518$ | $v_{d2} = 25.43$ |
| $r_4 = 31.2900$ | $d_4 = 5.700$ | $n_{d3} = 1.56873$ | $v_{d3} = 63.16$ |
| $r_5 = -14.3250$ | $d_5 = 1.000$ | | |
| $r_6 = \infty$ (Stop) | $d_6 =$ (Variable) | | |
| $r_7 = -25.7980$ (Aspheric) | $d_7 = 3.000$ | $n_{d4} = 1.58423$ | $v_{d4} = 30.49$ |
| $r_8 = -17.1690$ | $d_8 =$ (Variable) | | |
| $r_9 = -12.3180$ (Aspheric) | $d_9 = 1.800$ | $n_{d5} = 1.72916$ | $v_{d5} = 54.68$ |
| $r_{10} = -98.4780$ | | | |

Zooming Spaces

| f | 38.0 | 63.0 | 105.0 |
|---|---|---|---|
| $d_2$ | 5.5000 | 5.4470 | 5.2400 |
| $d_6$ | 16.4070 | 8.1040 | 2.9980 |
| $d_8$ | 4.6850 | 4.8610 | 5.0000 |

Aspherical Coefficients
1st surface

P=1.0000

$A_4=-0.51554\times10^{-4}$ $A_6=-0.23870\times10^{-6}$ $A_8=-0.21047\times10^{-8}$ $A_{10}=0.52734\times10^{-11}$ 3rd surface

P=1.0000

$A_4=-0.82534\times10^{-5}$ $A_6=-0.17056\times10^{-6}$ $A_8=0.63689\times10^{-9}$ $A_{10}=-0.11925\times10^{-10}$ 7th surface

P=1.0000

$A_4=0.57554\times10^{-5}$ $A_6=0.18904\times10^{-6}$ $A_8=0.28612\times10^{-8}$ $A_{10}=-0.39082\times10^{-10}$ 9th surface 32 0.7059

$A_4=0.11860\times10^{-5}$ $A_6=-0.47085\times10^{-7}$ $A_8=-0.30473\times10^{-8}$ $A_{10}=0.26984\times10^{-10}$

EXAMPLE 11

$f=38.0\sim63.0\sim105.0$ $F_{NO}=4.6\sim6.5\sim9.2$ $2\omega=59.2\sim37.8\sim23.2°$ $f_B=8.1\sim32.6\sim73.7$

| | | | |
|---|---|---|---|
| $r_1 = 110.0870$ | $d_1 = 2.000$ | $n_{d1} = 1.74100$ | $\nu_{d1} = 52.68$ |
| $r_2 = 34.6890$ (Aspheric) | $d_2 = 4.300$ | | |
| $r_3 = 41.6150$ | $d_3 = 6.700$ | $n_{d2} = 1.75520$ | $\nu_{d2} = 27.51$ |
| $r_4 = 19.6490$ | $d_4 = 0.900$ | | |
| $r_5 = 24.0480$ | $d_5 = 6.600$ | $n_{d3} = 1.62041$ | $\nu_{d3} = 60.27$ |
| $r_6 = -16.2990$ | $d_6 = 1.000$ | | |
| $r_7 = \infty$ (Stop) | $d_7$ = (Variable) | | |
| $r_8 = -94.3200$ (Aspheric) | $d_8 = 3.000$ | $n_{d4} = 1.58423$ | $\nu_{d4} = 30.49$ |
| $r_9 = -40.1870$ (Aspheric) | $d_9 = 5.000$ | | |
| $r_{10} = -12.6230$ | $d_{10} = 1.800$ | $n_{d5} = 1.72916$ | $\nu_{d5} = 54.68$ |
| $r_{11} = -59.3880$ | | | |

Zooming Spaces

| f | 38.0 | 63.0 | 105.0 |
|---|---|---|---|
| $d_7$ | 16.9940 | 8.2690 | 2.9640 |

Aspherical Coefficients
2nd surface

P=1.0000

$A_4=0.53869\times10^{-4}$ $A_6=0.32534\times10^{-6}$ $A_8=0.16012\times10^{-9}$ $A_{10}=0.27220\times10^{-10}$ 8th surface

P=1.0000

$A_4=0.68181\times10^{-4}$ $A_6=0.24774\times10^{-6}$ $A_8=0.63202\times10^{-8}$ $A_{10}=-0.14888\times10^{-10}$ 9th surface

P=1.0000

$A_4=0.31685\times10^{-4}$ $A_6=0.25345\times10^{-6}$ $A_8=0.12650\times10^{-8}$ $A_{10}=0.42031\times10^{-10}$

EXAMPLE 12

$f=38.0\sim63.0\sim105.0$ $F_{NO}=4.6\sim6.5\sim9.2$ $2\omega=59.2\sim37.8\sim23.2°$ $f_B=8.4\sim32.1\sim72.0$

| | | | |
|---|---|---|---|
| $r_1 = \infty$ | $d_1 = 2.000$ | $n_{d1} = 1.67270$ | $\nu_{d1} = 32.10$ |
| $r_2 = 69.8310$ (Aspheric) | $d_2 = 1.300$ | | |
| $r_3 = 164.6040$ | $d_3 = 9.300$ | $n_{d2} = 1.80518$ | $\nu_{d2} = 25.43$ |
| $r_4 = 52.3390$ | $d_4 = 6.100$ | $n_{d3} = 1.60311$ | $\nu_{d3} = 60.70$ |
| $r_5 = -14.8780$ | $d_5 = 1.000$ | | |
| $r_6 = \infty$ (Stop) | $d_6$ = (Variable) | | |
| $r_7 = -55.4410$ (Aspheric) | $d_7 = 3.000$ | $n_{d4} = 1.58423$ | $\nu_{d4} = 30.49$ |
| $r_8 = -28.4570$ | $d_8 = 5.000$ | | |
| $r_9 = -11.9550$ | $d_9 = 1.500$ | $n_{d5} = 1.72916$ | $\nu_{d5} = 54.68$ |
| $r_{10} = -60.9590$ | | | |

Zooming Spaces

| f | 38.0 | 63.0 | 105.0 |
|---|---|---|---|
| $d_6$ | 15.7140 | 7.4750 | 2.4660 |

Aspherical Coefficients
2nd surface

P=1.0000

$A_4=0.78584\times10^{-4}$ $A_6=0.33153\times10^{-6}$ $A_8=0.96265\times10^{-8}$ $A_{10}=-0.14818\times10^{-9}$ $A_{12}=0.16452\times10^{-11}$ 7th surface

P=-0.4605

$A_4=0.41157\times10^{-4}$ $A_6=-0.14441\times10^{-6}$ $A_8=0.14753\times10^{-7}$ $A_{10}=-0.21923\times10^{-9}$ $A_{12}=0.11760\times10^{-11}$

EXAMPLE 13

$f=38.0\sim63.0\sim105.0$ $F_{NO}=4.6\sim6.5\sim9.2$ $2\omega=59.2\sim37.8\sim23.2°$ $f_B=7.0\sim31.5\sim72.7$

| | | | |
|---|---|---|---|
| $r_1 = 17.7460$ (Aspheric) | $d_1 = 2.000$ | $n_{d1} = 1.49241$ | $\nu_{d1} = 57.66$ |
| $r_2 = 12.1740$ | $d_2 = 6.600$ | | |
| $r_3 = 61.8200$ | $d_3 = 5.400$ | $n_{d2} = 1.75520$ | $\nu_{d2} = 27.51$ |
| $r_4 = 25.4070$ | $d_4 = 6.100$ | $n_{d3} = 1.56873$ | $\nu_{d3} = 63.16$ |
| $r_5 = -15.3190$ | $d_5 = 1.000$ | | |
| $r_6 = \infty$ (Stop) | $d_6$ = (Variable) | | |
| $r_7 = -42.6410$ (Aspheric) | $d_7 = 3.500$ | $n_{d4} = 1.58423$ | $\nu_{d4} = 30.49$ |
| $r_8 = -25.2560$ | $d_8 = 5.100$ | | |
| $r_9 = -12.3040$ | $d_9 = 1.600$ | $n_{d5} = 1.72916$ | $\nu_{d5} = 54.68$ |
| $r_{10} = -52.8210$ | | | |

Zooming Spaces

| f | 38.0 | 63.0 | 105.0 |
|---|---|---|---|
| $d_6$ | 17.3710 | 8.0190 | 2.3340 |

Aspherical Coefficients
1st surface

P=1.0000

$A_4=-0.51694\times10^{-4}$ $A_6=-0.35383\times10^{-6}$ $A_8=-0.20377\times10^{-8}$ $A_{10}=0.28897\times10^{-11}$ $A_{12}=0$ 7th surface $P=1.0000$ $A_4=0.35630\times10^{-4}$ $A_6=0.49508\times10^{-8}$ $A_8=0.60186\times10^{-8}$ $A_{10}=-0.71264\times10^{-10}$ $A_{12}=0.33744\times10^{-12}$ FIGS. 8(a) to 20(l) graphically show spherical aberration, astigmatism, distortion and lateral chromatic aberration at the wide end, the standard position, and the tele end in Examples 1 to 13. In these graphs: (a) shows spherical aberration at the wide end; (b) shows astigmatism at the wide end; (c) shows distortion at the wide end; (d) shows lateral chromatic aberration at the wide end; (e) shows spherical aberration at the standard position; (f) shows astigmatism at the standard position; (g) shows distortion at the standard position; (h) shows lateral chromatic aberration at the standard position; (i) shows spherical aberration at the tele end; (j) shows astigmatism at the tele end; (k) shows distortion at the tele end; and (l) shows lateral chromatic aberration at the tele end.

Tables below show the values of the above-described conditions (1) to (5) in the above Examples 1 to 13.

| Conditions | Example 1 | Example 2 | Example 3 | Example 4 | Example 5 |
|---|---|---|---|---|---|
| (1) | 0.769 | 0.754 | 0.773 | 0.728 | 0.755 |
| (2) | 0.957 | 0.888 | 0.556 | 0.284 | 1.044 |
| (3) | −0.705 | −0.492 | −0.195 | −0.541 | −0.600 |
| (4) | 0.560 | 0.816 | 0.128 | 0.663 | 0.938 |
| (5) | −3.619 | −2.210 | −1.885 | −1.525 | −3.445 |

| Conditions | Example 6 | Example 7 | Example 8 | Example 9 | Example 10 |
|---|---|---|---|---|---|
| (1) | 0.727 | 0.752 | 0.727 | 0.735 | 0.762 |
| (2) | 1.250 | 1.032 | 0.930 | 0.644 | 0.702 |
| (3) | −0.255 | −0.695 | −0.906 | −0.255 | −0.351 |
| (4) | 0.440 | 0.926 | 0.504 0.410 | 0.134 | 0.177 |
| (5) | −2.586 | −3.075 | −3.422 | −2.115 | −3.482 |

| Conditions | Example 11 | Example 12 | Example 13 |
|---|---|---|---|
| (1) | 0.769 | 0.759 | 0.795 |
| (2) | 1.015 | 1.525 | 0.885 |
| (3) | −0.550 | −0.366 | −0.425 |
| (4) | 0.521 | 1.000 | 0.186 |
| (5) | none | −6.816 | −3.586 |

(Note)
Regarding the value for the condition (4) in Example 8, the upper value is the value of the negative lens element that is most closest to the object side, and the lower value is the value of the second negative lens element.

Figure 21:
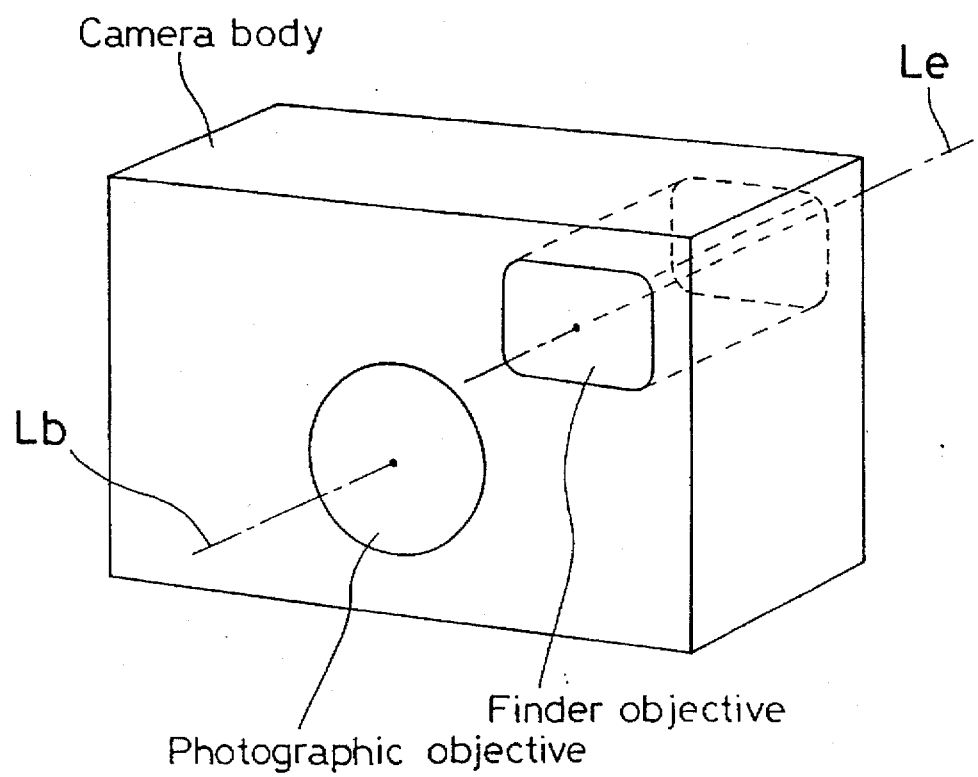
FIG. 21 is a perspective view showing the arrangement of a compact camera.
Figure 22:
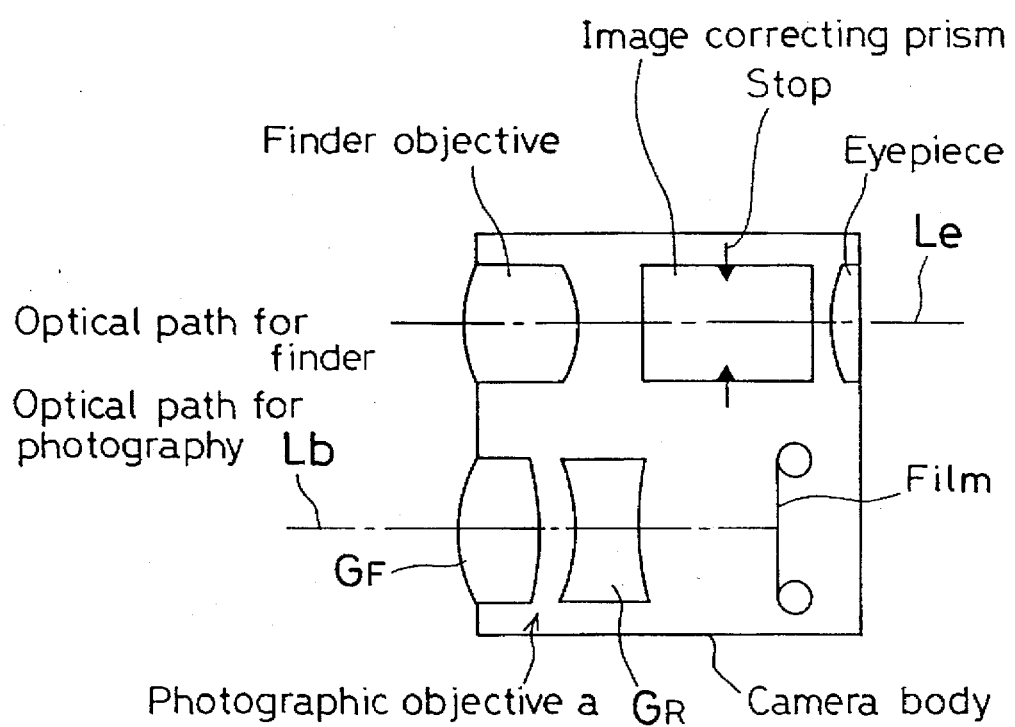
FIG. 22 is a sectional view of the compact camera shown in FIG. 21.

The two-unit zoom lens system of the present invention as described in the foregoing Examples may be employed, for example, as a photographic objective a of a compact camera as shown in the perspective view of FIG. 21 and also in the sectional view of FIG. 22. In these figures, $L_b$ denotes an optical path for photography, and $L_e$ an optical path for finder. The two optical paths $L_b$ and $L_e$ lie parallel to each other. An image of an object is observed through a finder that is composed of a finder objective, an image correcting prism, a stop, and an eyepiece, and formed on a film by the photographic objective a.

As will be clear from the foregoing description, the arrangement of the present invention makes it possible to obtain a two-unit zoom lens system with positive and negative lens units, which is compact and yet provides a high zoom ratio and high performance despite a relatively small number of constituent lens elements.

What we claim is:

1. A two-unit zoom lens system having a high zoom ratio and comprising, in order from an object side:
   a front lens unit of positive refractive power and comprising, in order from an object side:
   a first lens component of negative refractive power including:
   an aspherical surface;
   said first lens component not including any positive lens component; and
   a second lens component of positive refracting power including, in order from an object side:
   a negative lens element; and
   a positive lens element,
   a spacing between said first lens component and said second lens component remaining unchanged during zooming; and
   a rear lens unit of negative refractive power;
   zooming being effected by varying a spacing between said front lens unit and said rear lens unit; and
   said two-unit zoom lens system satisfying the following conditions:

$$0.5 < f_F/f_W < 1.0 \qquad (1)$$

$$0.5 < d_N/d_P < 2.0 \qquad (2)$$

where $f_F$ is a focal length of said front lens unit, $f_W$ is a focal length of said two-unit lens system at a wide end, and $d_N$ and $d_P$ are center thicknesses of said negative lens element and said positive lens element, respectively.

2. A two-unit zoom lens system having a high zoom ratio and comprising, in order from an object side:
   a front lens unit of positive refractive power and comprising, in order from an object side:
   a first lens component of negative refractive power consisting of:
   a negative meniscus lens element having a convex surface directed toward an object side; and
   at least one aspherical surface; and
   a second lens component of positive refractive power comprising, in order from an object side:
   a negative lens element; and
   a positive lens element;
   a spacing between said first lens component and said second lens component remaining unchanged during zooming; and
   a rear lens unit of negative refractive power;
   zooming being effected by varying a spacing between said front lens unit and said rear lens unit; and
   said two-unit zoom lens system satisfying the following condition:

$$0.5 < f_F/f_W < 1.0 \qquad (1)$$

$$-1.0 < f_W/f_{F1} < -0.18 \qquad (3)$$

where $f_F$ is a focal length of said front lens unit, $f_W$ is a focal length of said two-unit lens system at a wide end, and $f_{F1}$ is a focal length of said first lens component.

3. A two-unit zoom lens system according to claim 1 or 2, further satisfying the following condition:

$$0<(r_A-r_B)/(r_A+r_B)\leq 1 \quad (4)$$

where $r_A$ and $r_B$ are a radius of curvature of an object-side surface and a radius of curvature of an image-side surface, respectively, of said negative lens element in said first lens component.

4. A two-unit zoom lens system having a high zoom ratio and comprising, in order from an object side:
   a front lens unit of positive refractive power and comprising, in order from an object side:
      a negative meniscus lens element having a convex surface directed toward an object side and including at least one aspherical surface, and
      a cemented lens comprising:
         a negative lens element; and
         a positive lens element,
      a spacing between said negative meniscus lens element and said cemented lens remaining unchanged during zooming; and
   a rear lens unit of negative refractive power;
   zooming being effected by varying a spacing between said front lens unit and said rear lens unit; and
   said two-unit zoom lens system satisfying the following condition:

$$0.5<f_F/f_W<1.0 \quad (1)$$

$$0.5<d_N/d_P<2.0 \quad (2)$$

where $f_F$ is a focal length of said front lens unit, $f_W$ is a focal length of said two-unit lens system at a wide end, an $d_N$ and $d_P$ are center thicknesses of said negative lens element and said positive lens element, respectively.

5. A two-unit zoom lens system according to claim 1, 2 or 4, wherein said rear lens unit comprises:
   at least one positive lens element; and
   at least one negative lens element.

6. A two-unit zoom lens system according to claim 1, 2 or 4, wherein said rear lens unit comprises, in order from an object side:
   a positive lens element which is a meniscus lens element having a convex surface directed toward an image side; and
   a negative lens element which is a meniscus lens element having a convex surface directed toward said image side.

7. A two-unit zoom lens system according to claim 5, wherein:
   a spacing between said positive lens element and said negative lens element in said rear lens unit is varied during zooming.

8. A two-unit zoom lens system according to claim 1 or 4, further satisfying the following condition:

$$0.5<d_N/d_P<1.5 \quad (2')$$

9. A two-unit zoom lens system according to claim 4, further satisfying the following condition:

$$-10.0<f_{CE}/f_W<0 \quad (5)$$

where $f_{CE}$ is a focal length of a cemented lens surface of said cemented lens.

10. A two-unit zoom lens system according to claim 4, further satisfying the following condition:

$$0<(r_A-r_B)/(r_A+r_B)\leq 1 \quad (4)$$

where $r_A$ and $r_B$ are a radius of curvature of an object-side surface and a radius of curvature of an image-side surface, respectively, of said negative meniscus lens element in said front lens unit.

11. A two-unit zoom lens system according to claim 6, wherein:
   a spacing between said positive lens element and said negative lens element in said rear lens unit is varied during zooming.

\* \* \* \* \*